(12) United States Patent
Kamau

(10) Patent No.: US 7,958,670 B2
(45) Date of Patent: Jun. 14, 2011

(54) DECORATIVE POLE AND BASE STAND STABILIZING CONTAINER

(76) Inventor: Maria N Kamau, Santa Clara, CA (US)

( * ) Notice: Subject to any disclaimer, the term of this patent is extended or adjusted under 35 U.S.C. 154(b) by 0 days.

(21) Appl. No.: 12/874,222

(22) Filed: Sep. 2, 2010

(65) Prior Publication Data

US 2011/0000132 A1 Jan. 6, 2011

Related U.S. Application Data

(63) Continuation-in-part of application No. 11/542,821, filed on Oct. 4, 2006, now Pat. No. 7,797,880.

(51) Int. Cl.
*A01G 9/02* (2006.01)
(52) U.S. Cl. .......................................... 47/66.6; 47/66.1
(58) Field of Classification Search .................. 47/65.5, 47/66.1, 66.6, 86
See application file for complete search history.

(56) References Cited

U.S. PATENT DOCUMENTS

| | | | |
|---|---|---|---|
| 5,493,976 A | 2/1996 | Hammond | |
| 6,454,125 B1 * | 9/2002 | Rink, Jr. | 221/26 |
| 6,615,543 B1 | 9/2003 | Palsrok | |
| 2004/0216376 A1 | 11/2004 | Missry | |

\* cited by examiner

*Primary Examiner* — Kimberly S Smith
*Assistant Examiner* — Monica Williams

(57) ABSTRACT

A container surrounding a pole and base stand of a freestanding floor lamp or similar device. The container includes a sidewall integrally attached to a base panel to form a ballast volume, a fixture void, and a wedge void extending into the ballast volume. The container can take on a variety of shapes and can be split into two sections comprising an upper planter section and a lower reservoir section. The upper planter section includes a ballast volume, a pole void and a wedge void and can include a plurality of drain ports with or without integrally attached circumferentially arrayed stands. The lower reservoir section includes a ballast volume, a wedge void, and a base void and can include a watering port. A wedge section can be provided to close off the wedge void and define the aperture in which a freestanding device such as a floor lamp is housed.

20 Claims, 18 Drawing Sheets

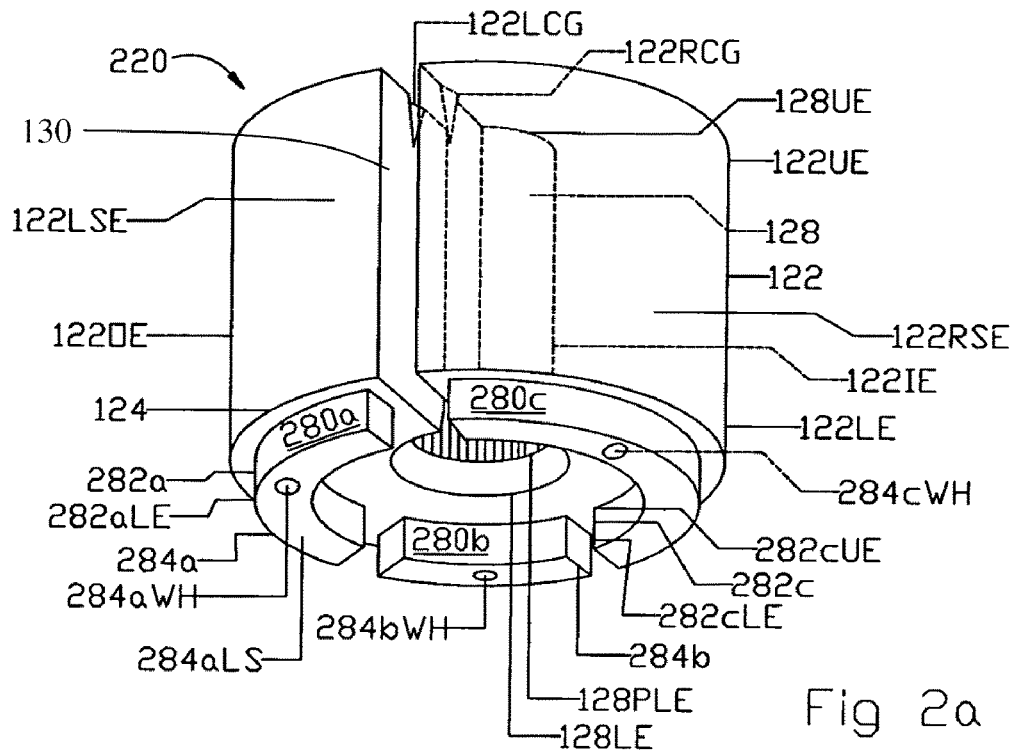
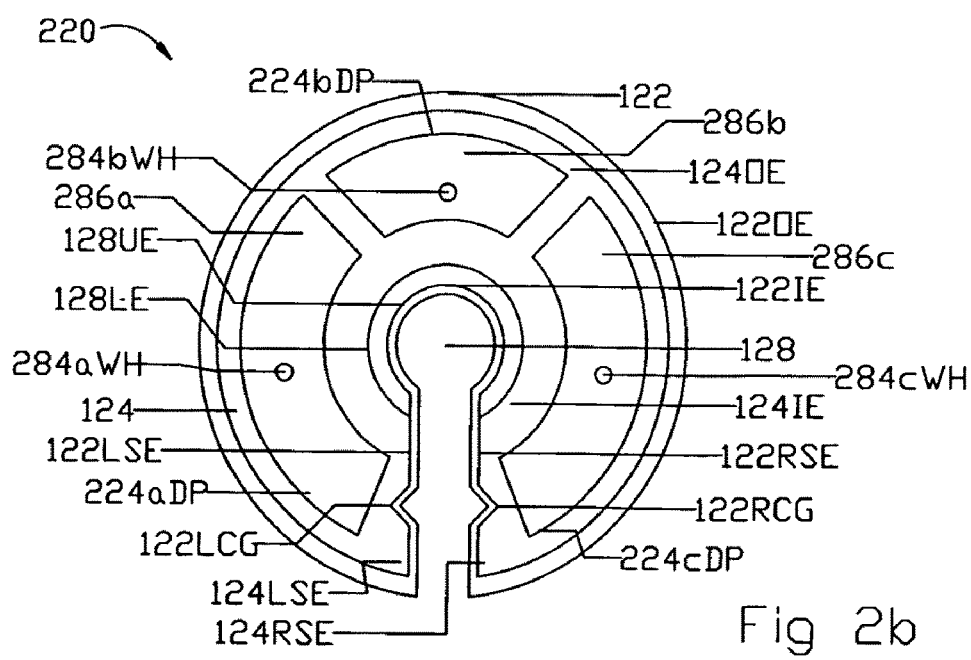

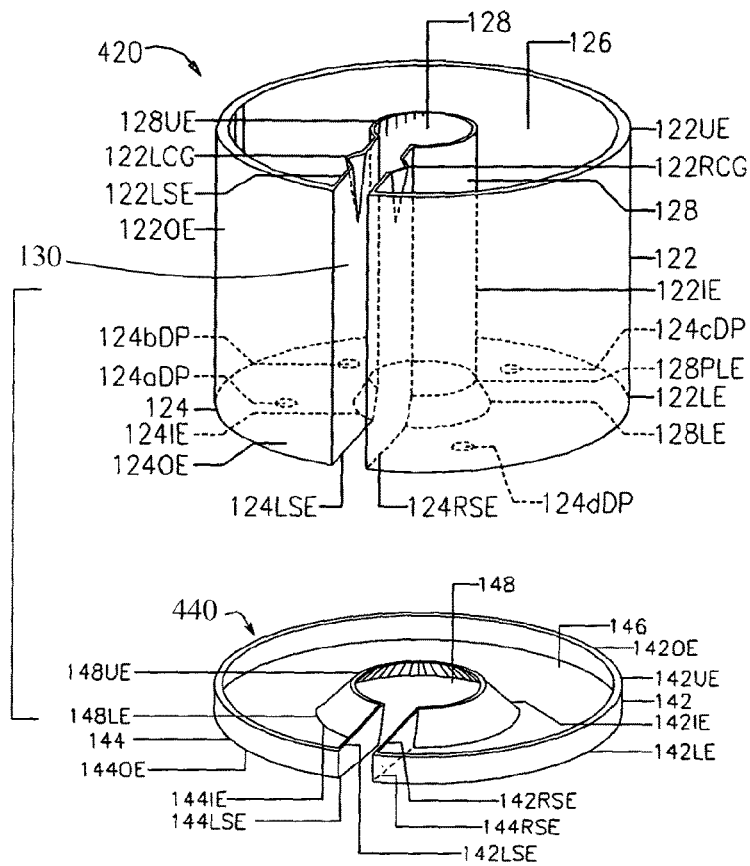
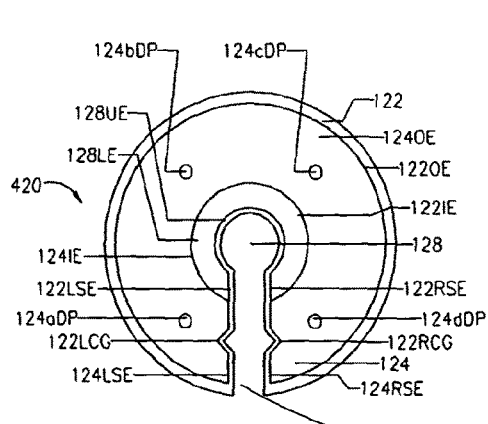
Fig 4a
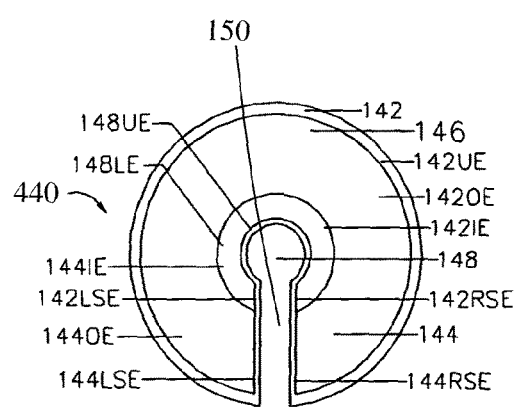
Fig 4b
Fig 4c

DECORATIVE POLE AND BASE STAND STABILIZING CONTAINER

CROSS-REFERENCE TO RELATED APPLICATIONS

This application is a continuation in part of prior application Ser. No. 11/542,821, "Decorative pole and base stand stabilizing container", filed Oct. 4, 2006, Maria N. Kamau inventor.

BACKGROUND OF THE INVENTION

1. Field of the Invention

This invention relates to containers, specifically to plant receptacles used in combination with freestanding devices that have a pole and a base stand, such as a floor lamp.

2. Background of the Invention

Common freestanding fixtures such as floor lamps, floor fans, coat stands, hat stands, and patio sun umbrellas come equipped with a pole and a base stand. Often the base stands provided with such fixtures have at least one if not both of the following problems. Firstly, the base stands are too small or too lightweight to offer sufficient stability from accidental tip-over if bumped. Secondly, the base stands are often aesthetically incompatible with the home or office décor.

Previously, prior art designs mitigated the aforementioned problems by creating a contact buffer to keep foot and pet traffic away from the freestanding fixture. Additionally, prior art designs lessened the effect of an aesthetically incompatible base stand of a freestanding fixture by providing a receptacle to contain beautiful plant life or flowers and to serve as a visual alternative.

Usually, construction of a contact buffer and a visual alternative involved placing multiple units of the conventional planters or prior art around or adjacent to the base stand, or affixed to the poles, of the freestanding fixture. This method tends to clutter and crowd floor space, thus creating a trip hazard. Also, this method tends to be expensive if base stands of several freestanding fixtures in a room need contact buffers or need visual alternatives created around them.

Prior art designs that attempted to create a contact buffer or visual alternative around the freestanding fixture ignored the need to actually stabilize the fixture should it nevertheless get bumped. Furthermore, prior art designs additionally ignored the need to economize or tidy the floor space in a room.

Many people enjoy decorating household, office, or outdoor areas with plants or ballast held in a container. Prior art designs that attempted to integrate containers with freestanding fixtures tend to be fixture-specific such as a table-top planter for a patio umbrella assembly or a mail box planter for mail boxes with square posts.

Consequently, the prior art is adaptable only to specific types of fixtures, requiring that a different type of planter be used for each different type of fixture. This creates aesthetic disharmony in a given room or outdoor setting.

U.S. Pat. No. 6,539,665 issued on April 2003 to Llona discloses a planter having a vertical rabbet for conformably engaging a generally upright elongated member.

U.S. Pat. No. 5,493,976 issued on February 1996 to Hammond discloses a tray designed to fit around the midsection of an umbrella pole type table, and serve condiments.

U.S. Pat. No. 2,799,972 issued on July 1957 to Teixeira discloses a vessel for growing orchids and other rhizomatous plants.

U.S. Pat. No. D386,114 issued on November 1997 to Carson discloses an ornamental design for a tree collar planter.

U.S. Pat. No. D480,986 issued on October 2003 to Taylor discloses a post planter disengageably attached to a support post of a deck or porch. The post planter is attached at any height along the support post, and is made of two sections that wrap around the support post, and are held by clips at the top and a mounting mechanism that is attached to the support post.

U.S. Pat. No. 6,085,459 issued on July 2000 to Conner discloses a vase container for use with a table umbrella assembly. The vase includes a two-part lightweight plastic construction where the respective halves are secured to an upright table umbrella pole.

U.S. Pat. No. 6,615,543 to Palsrok discloses a wire basket arrangement held together by wires, which is not capable, absent a liner or other material, of holding soil, ballast, or other material. The Palsrok device, having an inherently lightweight open wire structure, does not appear to be designed to stabilize freestanding structures, but rather is shown stabilizing earth stabilized structures such as flagpoles.

U.S. Pat. Application 2004/0216376 to Missry discloses a planter device, but the design would make it difficult or impossible to position around a freestanding fixture with pole and a base without disassembling the pole from the base.

Until now, prior art planter inventions have failed to simultaneously stabilize, aesthetically harmonize, and decorate freestanding fixtures. Attempts made by most prior art inventions have marginally addressed only one of the three aforementioned functions or advantages. For instance, U.S. Pat. No. 6,539,665 to Llona, U.S. Pat. No. 5,493,976 to Hammond, U.S. Pat. No. 2,799,972 to Teixeira, U.S. Pat. No. D386,114 to Carson, U.S. Pat. No. D480,986 to Taylor and U.S. Pat. No. 6,085,459 to Conner, each has only provided a container with which to decorate a fixture, that partially or wholly surrounds the pole of a particular fixture.

The aforementioned inventions could not be useful in stabilizing and concealing a base stand of a freestanding fixture. In fact, some of the aforementioned prior art aggressively seek stability from the pole or post of a fixture itself by means of nails, brackets, clips, or other permanent attachments.

To create a contact buffer, Teixeira's invention would require an assembly of several units; even so, this would still not stabilize the base stand of a freestanding fixture. In addition, using multiple planter units arrayed about a freestanding fixture would pose a trip hazard or crowd and clutter floor space.

A closer look at FIGS. 7 and 8 of U.S. Pat. No. D386,114 to Carson and FIG. 11 of U.S. Pat. No. 5,493,976 to Hammond, show a portion of a uniformly vertical sidewall that defines a gap for admitting a vertical elongate member. The vertical uniformity of the gap illustrates the inability of these prior art devices to substantially surround the lower portion of a pole and the entire base stand of a device such as a floor lamp. Even if these two prior art devices were made large enough to envelop both the pole and base stand of a floor lamp, for instance, the resulting massive lateral u-shaped gap would not provide ornamentation or stability to the base stand of a freestanding fixture such as a floor lamp. Consequently, if the fixture was bumped, Carson's and Hammond's inventions would not restricts lateral movement of the base stand enough to deter the fixture from overturning if the fixture were to fall in a direction aligned with the gap.

Carson's invention serves only to decorate by providing a plant-growing container adapted to poles of items already stabilized by a subterranean anchor, such as a tree planted in the ground. Hammond's invention serves only as a utility container adapted to poles of items already stabilized by a patio umbrella assembly.

SUMMARY OF THE INVENTION

Objects and Advantages

Accordingly, several objects and advantages of the present invention are:

To provide a container that stabilizes a freestanding fixture by minimizing wobbling of the base stand once the fixture is bumped.

To provide a container that stabilizes a freestanding fixture by creating a contact barrier that discourages accidental bumping by foot or pet traffic.

To provide a container that decorates the freestanding fixture by surrounding the fixture with an attractive planter that can be filled with plant life or aesthetically pleasing ballast such as glass marbles.

To provide a container that can be adapted to various freestanding fixtures, such as a floor fan, a coat stand and a floor lamp, in a room or an outdoor setting.

To provide a container that can be used in conjunction with other similar container members to unify a decorating theme.

To provide a container that is easily assembled and disassembled and that does not require disassembling the freestanding fixture.

To provide a container that does not derive stability from the freestanding fixture by means of screws, nails, clips or brackets.

To provide a container that economizes floor space by surrounding and sharing the same general location with the freestanding fixture.

To provide a container that can have various configurations and aesthetic designs. To provide a container that is easy to assemble and use, that can be mass-produced in an automated and economical manner, and is readily affordable by the consumer.

Further objects and advantages will become apparent from a consideration of the following description and drawings.

The present invention provides a container for substantially surrounding a pole and a base stand of a generally upright elongated member such as a floor lamp.

The container invention includes a sidewall and a base panel. The sidewall includes an upper end and a lower end spaced from the upper end and defines sides of a cavity. The base panel integrally attaches to the lower end of the sidewall to form a ballast volume, a fixture void, and a wedge void. The ballast volume may optionally hold and contains ballast or soil for plants to grow therein.

The fixture void is composed of a smaller diameter pole void opening (often cylindrical in nature and capable of holding the pole portion of the generally upright elongated member), connected to a larger diameter base void (often also a cylindrical or other axis of rotation shape that is capable of encompassing or covering the base stand of the generally upright elongated member). The fixture void receives and houses a pole and a base stand of a generally upright elongated member so that the pole and base stand may appear to be passing roughly through the center of the ballast volume. The height of the pole void can vary, but will often comprise between about 10% or 15% to about 85% to 90% of the total height of the container (neglecting any container support legs).

The wedge void serves two purposes. The wedge void, which is connected to both the pole void and base void portions of the fixture void, allows a pole and base stand to be positioned from a first position outside of the container, to a second position in which the pole and base stand are positioned inside the pole void and base void portions of the fixture void. The wedge void may optionally also receive and house an optional wedge section. In embodiments where the container has an upper portion and a lower portion, the wedge void itself may have an upper portion and a lower portion. In this specification, the term "wedge void" will generally denote the complete wedge void (which may have an upper and lower portion), but in situations where the lower wedge void is discussed specifically, then the term lower wedge void will be used. The upper wedge void will generally just be referred to as the wedge void.

Often the container will be substantially in the shape of a cylinder or modified cylinder, and the fixture void will often pass through the center of this modified cylinder, creating a shape that from above (neglecting the space occupied by the wedge void) may otherwise appear to have a ring like or "annular" structure. Thus in an alternative nomenclature, the invention may be described in terms of modifications to a basic annular or cylindrical annular like structure, or properties of a basic annular or cylindrical annular like structure. Here the term annular may be taken loosely, and the ring like or cylindrical like structure need not be a perfect ring or cylinder, but may have angular portions, or indeed be composed of entirely angular portions, in addition to curved portions.

Alternatively, the container can be separated into an upper planter section and a lower reservoir section. The sidewall and the base panel of the upper planter section may integrally combine to form a ballast volume, a wedge void and a pole void and can include a plurality of drain ports with or without integrally attached circumferentially arrayed stands. The sidewall and the base panel of the lower reservoir section integrally combine to form a water volume, a wedge void, and a base void and can include a watering port.

The container invention can take on a variety of shapes and can include a wedge section to detachably close off the wedge void. In order to better distinguish the part of the void portion of the container that receives and houses a pole and a base stand from the part of the void portion of the container that can hold a wedge section, the portion of the void that is always available to house a pole and a base stand will be termed the "fixture void", and the portion of the void that can optionally house a wedge section will be termed the "wedge void". Again the fixture void itself is comprised of a pole void capable of housing the pole section, and the base void capable of housing the base stand of the freestanding fixture.

The sides and bottom of this container will generally be constructed of a solid material, so that the container is capable of holding ballast, soil, water, or other material without the need of a plastic liner or other lining material.

BRIEF DESCRIPTION OF THE DRAWINGS

In the drawings, closely related figures have the same number but different alphabetic suffixes.

FIG. 2a shows a bottom perspective view of the upper planter section with plurality of tri-sectional circumferentially shaped circumferentially arrayed stands.

FIG. 2b shows a top view of upper planter section with plurality of tri-sectional circumferentially shaped circumferentially arrayed stands.

FIG. 4a shows a top perspective view of alternative design of the upper planter section with a plurality of longitudinal through-holes or drain ports without the associated plurality of circumferentially arrayed stands.

FIG. 4b shows a top view of alternative design of the upper planter section with a plurality of longitudinal through-holes or drain ports without the associated plurality of circumferentially arrayed stands.

FIG. 4c shows a top view of an alternative design of the lower reservoir section.

DETAILED DESCRIPTION OF THE INVENTION

Figure 1A:
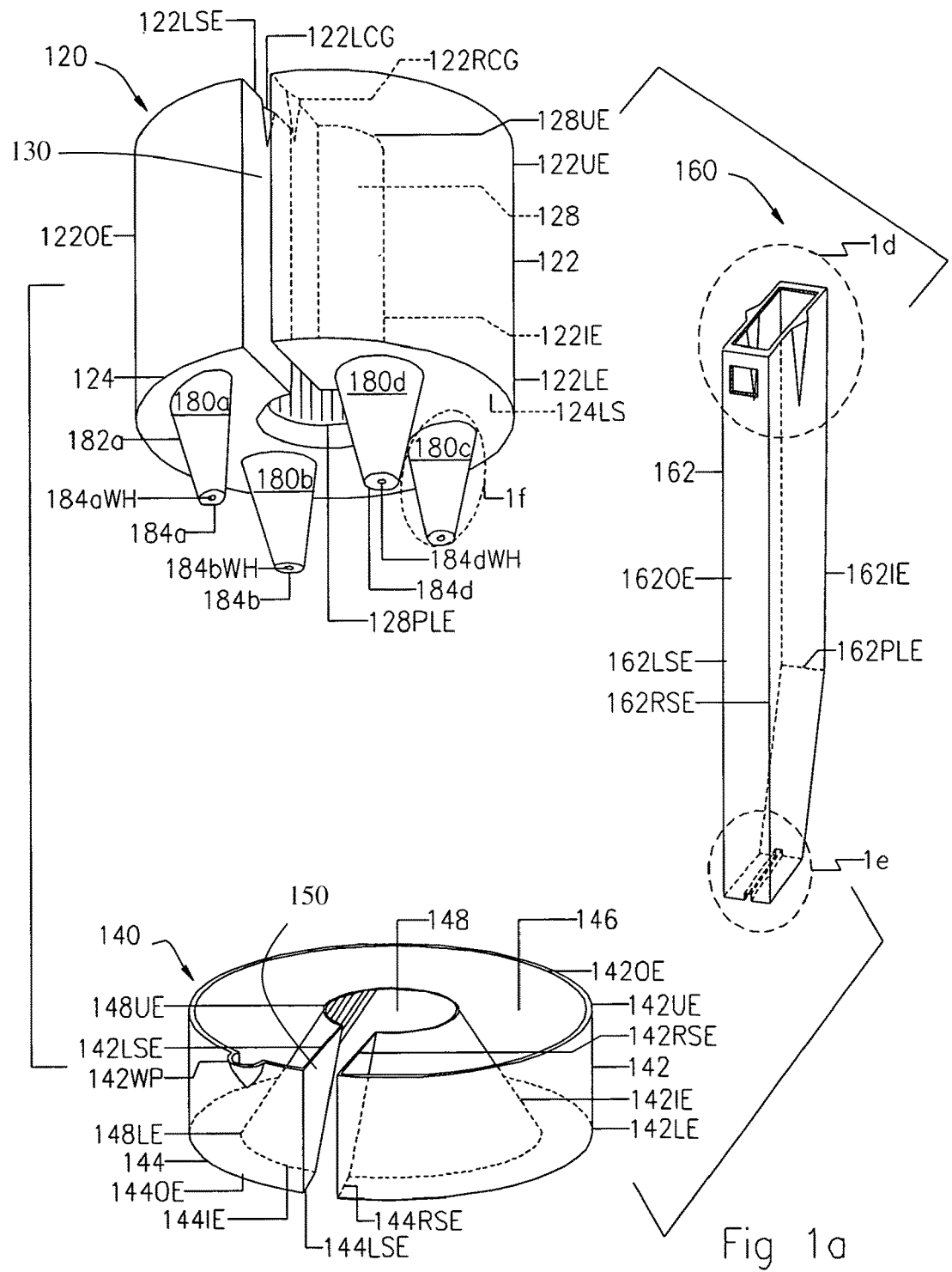
FIG. 1a shows a bottom perspective view of an upper planter section with plurality of circumferentially arrayed stands, and also shows top perspective views of a lower reservoir section and a wedge section.

In this disclosure, the terms container and planter will often be used interchangeably. This is because the container, even when filled with ballast, may or may not actually be used for planting purposes.

Here the term container is used in its normal sense, which is an object that can be used to hold things. More specifically the container of the invention is to be understood as being capable of holding materials such as soil or water, which are generally composed of very small particles that will otherwise pass through wire meshes and other holes. In general the drawings in this disclosure should be understood as showing the edges of solid walls, so that the solid walls are generally capable of holding materials. The drawings should not be misconstrued as showing the edges of a wire mesh structure.

In one embodiment, the invention may be a container or planter intended to fit around a freestanding pole with a pedestal base, where this pole generally has a diameter substantially smaller than the diameter of the container, and the pedestal base will generally have a diameter larger than the diameter of the pole, but smaller than the diameter of the container. This container may, for example, comprise a top with a substantially annular ballast holding zone, a base panel, and an inner void extending from this top to the solid base panel. This substantially annular ballast holding zone will often have a first perimeter comprising a substantial majority of the perimeter of the annular ring-like structure. Here, for example, the first perimeter may comprise approximately 75%, 80%, 85%, 90%, or even 95% or more of the majority of the perimeter of the annular ring-like structure.

When this first perimeter comprises 80% or more of the majority of the perimeter of the annular ring-like structure, it will be considered to comprise the substantial majority of the perimeter of the annular ring-like structure.

This container will generally also have a wedge void (130) extending from the outer edge of the substantially annular ballast holding zone, to the inner void of said annular ring-like structure. In some embodiments a wedge may fit into this wedge void, while in other embodiments no actual wedge will fit into this wedge void, and the void will remain open while the container is in use.

The wedge void will generally have a second perimeter that, in combination with said first perimeter, would comprise a full perimeter of an annular ring-like structure. Generally, the width of the second perimeter of this wedge void is selected to be wide enough to admit at least the pole, thus enabling the container to be slid around the pole. Thus if, for example, the first perimeter comprised approximately 75% of the majority of the perimeter of the annular ring like-structure, then the wedge void would comprise approximately 25% of the perimeter of the annular ring-like structure, and together the first perimeter and the wedge void would comprise approximately 100% of the perimeter of the annular ring like structure, and so on. Most commonly, the wedge void will often comprise about 10%+/−5% of the perimeter of the annular ring-like structure.

The container will also have an inner void or fixture void going from top to bottom, thus giving the container a partial-annular structure. At the top of the container this inner void or fixture void will have an opening or opening dimensions capable of at least admitting the pole (i.e. a pole void), and at the bottom of the container, the inner void or fixture void will have an opening or opening dimensions capable of admitting the pedestal base (i.e. base void).

The overall dimensions of the container and inner void or fixture void will thus be such that the container, when exterior to this pole with a pedestal base, may be slid around this pole with a pedestal base without having to disassemble either the pole from its pedestal base, or at least the lower section of the container.

As previously discussed, this inner void or fixture void (or alternatively inner fixture void) will generally comprise an upper pole void portion capable of admitting the pole, and a lower base void capable of admitting the pedestal base. Typically the diameter of the base void portion of the fixture void will be at least twice (2×) that of the pole void, and still larger multiples, e.g. 3×, 4×, 5×, 6×, 7×, 8×, 9×, 10×, or more are also possible. This is because the pedestal bases of freestanding pole structures are typically much wider than the diameters of the poles themselves.

In some embodiments, an optional detachable wedge section capable of being inserted into and/or being removed from the wedge void (130) from above without tools and without disassembling either said container or said pole with a spread base may be used. If such a wedge section is used, this wedge section may also be made capable of holding ballast. In some embodiments, to ensure that the wedge might not accidentally pop out of the wedge void due to pressure from the pole, or for added stability, this optional wedge section may also have one or more optional tongues or grooves configured to fit into at least one corresponding tongue or groove in the container.

In some embodiments, the container may also comprise a substantially annular upper ballast holding section that is detachable from a substantially annular lower section. The upper ballast holding section may optionally hold ballast, such as soil, planting soil, glass marbles, or other aesthetically pleasing material.

In some embodiments, the container's substantially annular ballast holding zone may be substantially circular, and the annular ring-like structure may comprise a ring with an interior fixture void. In other embodiments, the substantially annular ballast holding zone may comprises a polygon, and said annular ring-like structure may comprises a polygon with an interior fixture void.

More specifically, a container and its component parts of the preferred embodiment of the present invention are presented in detail by FIGS. 1a through 1g of the patent drawings.

DRAWINGS

Reference Numerals

10 Floor Lamp or Freestanding Fixture
12 Pole or Post
14 Base Stand or Pedestal
16 Electric Cord
18 Ballast or Soil
20 Plants or Flowers
22 Water The container includes an upper planter section 120 with a plurality of optional truncated conically shaped circumferentially arrayed stands 180a, 180b, 180c and 180d (bottom perspective view), a lower reservoir section 140 top perspective view), and a wedge section 160 (top perspective view), all shown in FIG. 1a.

Figure 1B:
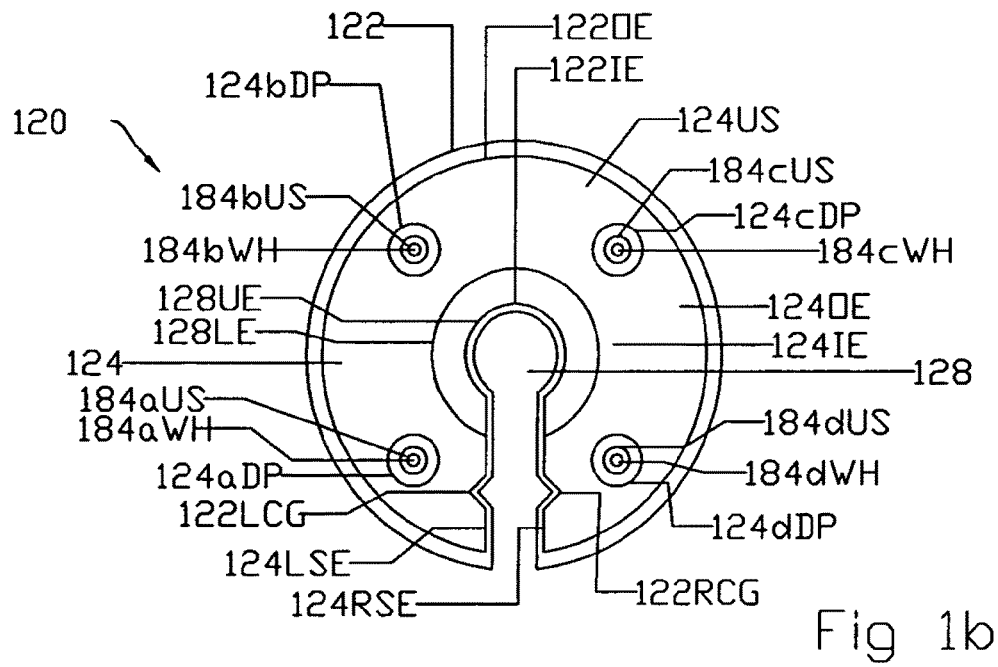
FIG. 1b shows a top view of the upper planter section and plurality of circumferentially arrayed stands.
Figure 1C:
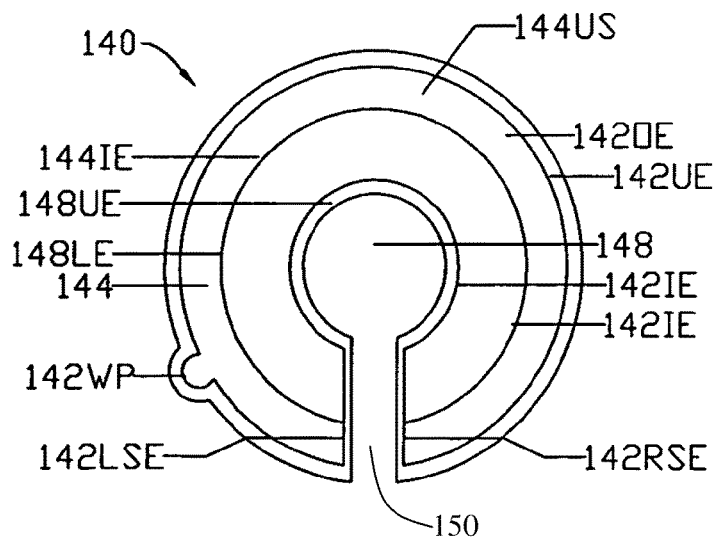
FIG. 1c shows a top view of the lower reservoir section.

FIGS. 1b (top view) and 1c (top view), illustrate further the upper planter section 120 and lower reservoir section 140 of the container, respectively.

Figure 1D:
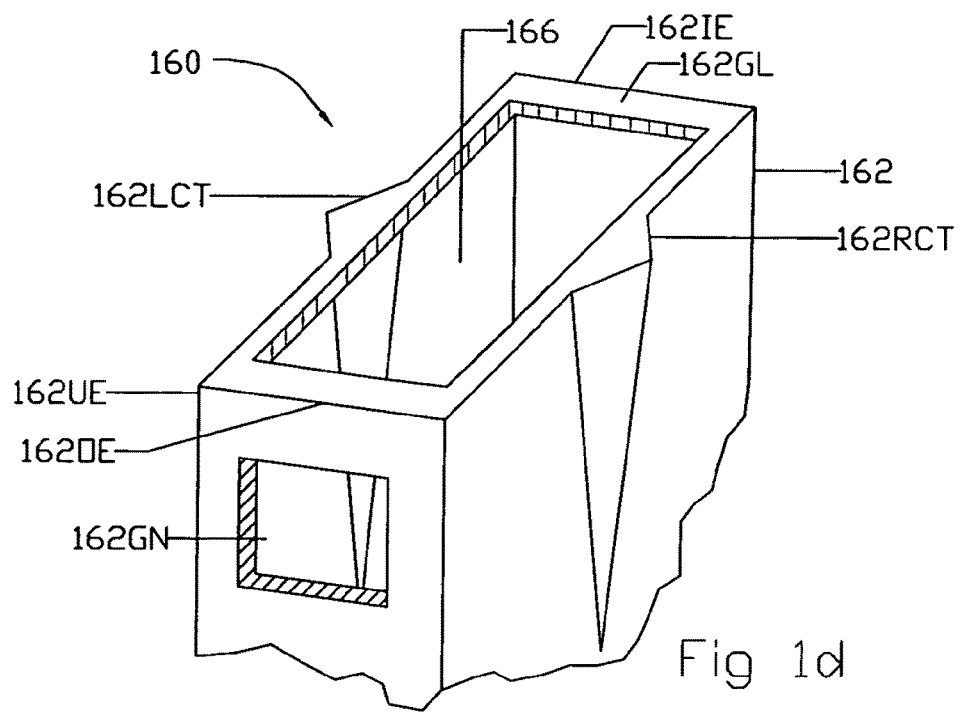
FIG. 1d shows a top perspective view of the upper portion of the wedge section.

FIGS. 1d (top perspective view) and 1e (top perspective view), illustrate further the upper portion and the lower portion of the wedge section 160 of the container, respectively.

Figure 1E:
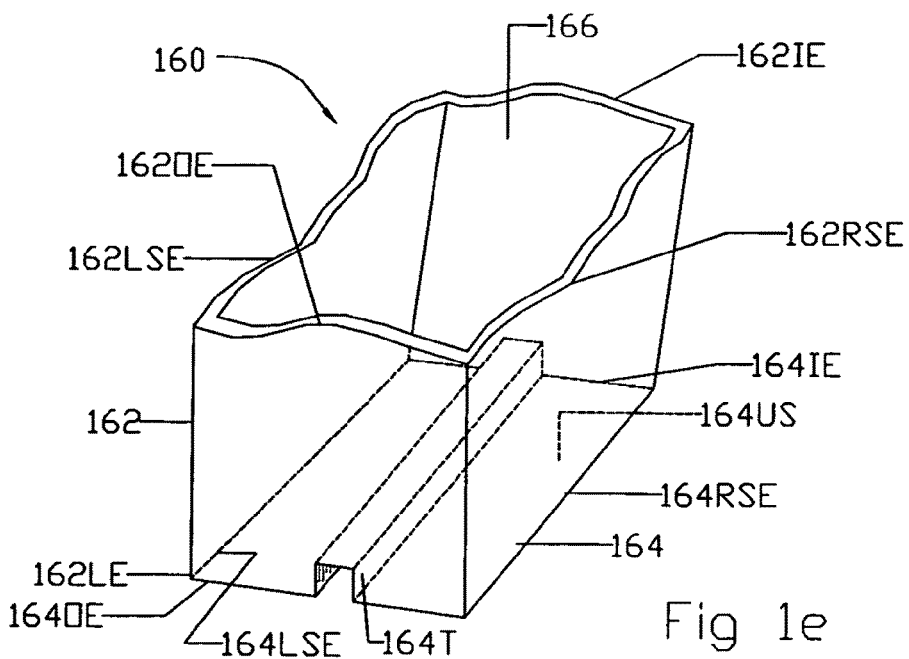
FIG. 1e shows a top perspective view of the lower portion of the wedge section.
Figure 1F:
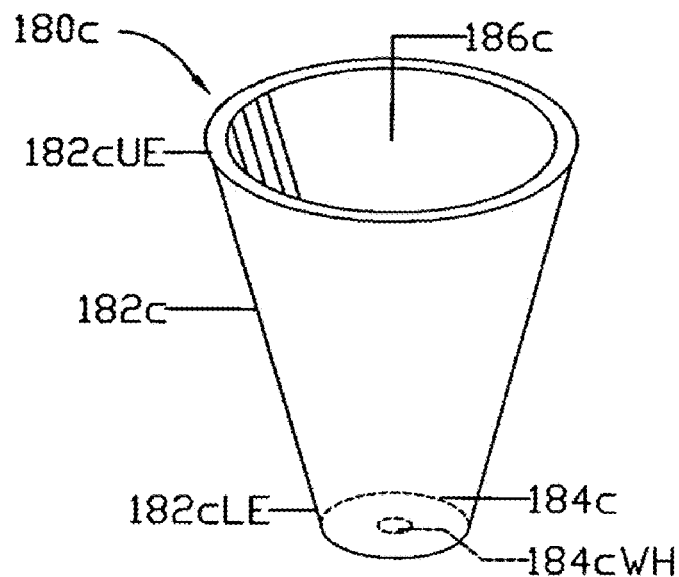
FIG. 1f shows a top perspective view of the circumferentially arrayed stand.

FIG. 1f (top perspective view) illustrates the circumferentially arrayed stand 180c of container 100. The circumferentially arrayed stand 180a or 180b or 180d of the container are similar to circumferentially arrayed stand 180c.

Figure 1G:
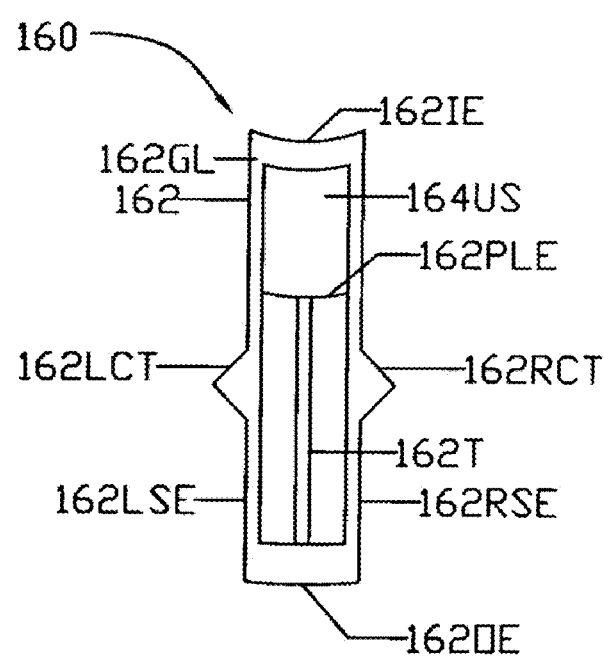
FIG. 1g shows a top view of wedge section.

FIG. 1g (top view) illustrates wedge section 160 of the container.

As shown in FIGS. 1a, 1c, 1d, 1e, and 1g, upper planter section 120, lower reservoir section 140, and wedge section 160, includes a sidewall 122, 142, and 162 respectively, and a base panel 124, 144, and 164 (shown in FIG. 1e), respectively. Both the sidewall and the base panel will generally be made of a solid material, such as a solid plastic, rather than an open material, such as a wire mesh, in order so that the complete container can hold ballast, soil, water, etc., without the need of any additional liners. Sidewall 122, 142, and 162 includes an upper end 122UE, 142UE, and 162UE and a lower end 122LE, 142LE, and 162LE vertically spaced from upper end 122UE, 142UE, and 162UE.

Sidewall 122, 142, and 162 of upper planter section 120, lower reservoir section 140, and wedge section 160, respectively, further includes an inner end 122IE, 142IE, and 162IE and an outer end 122OE, 142OE, and 162OE. Inner end 122IE, 142IE, and 162IE of sidewall 122, 142, and 162 abuts a fixture such as a floor lamp 10 (not shown) after the container is fully assembled. Outer end 122OE, 142OE, and 162OE of sidewall 122, 142, and 162 sets directly opposite inner end 122IE, 142IE, and 162IE and furthest away from the floor lamp 10 (not shown) after the container is fully assembled. Inner end 162IE of sidewall 162 of wedge section 160 include penultimate lower end 162PLE.

Sidewall 122, 142, and 162 includes a left side end 122LSE, 142LSE, and 162LSE and a right side end 122RSE, 142RSE, and 162RSE. Left side end 122LSE and 142LSE abuts left side end 162LSE of wedge section 160 after the container is fully assembled. Right side end 122RSE and 142RSE abuts right side end 162RSE of wedge section 160 after the container is fully assembled.

Upper end 142UE of outer end 142OE of sidewall 142 includes a watering port 142WP for adding water 22 into lower reservoir section 140.

Upper end 122UE of left side end 122LSE and upper end 122UE of right side end 122RSE of sidewall 122 includes a connecting groove 122LCG and 122RCG respectively. Upper end 162UE of left side end 162LSE and upper end 162UE of right side end 162RSE of sidewall 162 includes a connecting tongue 162LCT and 162RCT respectively.

Top end of outer end 162OE of sidewall 162 includes a grasping notch 162GN which provides a first means for inserting and removing wedge section 160 into and from upper planter section 120. Upper end 162UE of sidewall 162 includes a grasping ledge 162GL which provides a second means for inserting and removing wedge section 160 into and from upper planter section 120.

Base panel 124, 144, and 164, of upper planter section 120, lower reservoir section 140 and wedge section 160 respectively, includes an upper surface 124US, 144US, and 164US and a lower surface 124LS, 144LS (not shown), and 164LS (not shown) spaced from upper surface 124US, 144US and 162US.

Base panel 124, 144, and 164 further includes an inner end 124IE, 144IE, and 164IE and an outer end 124OE, 144OE, and 164OE. Inner end 124IE, 144IE, and 164IE of base panel 124, 144, and 164 abuts floor lamp 10 (not shown) after the container is fully assembled. Outer end 124OE, 144OE, and 164OE of base panel 124, 144, and 164 sets directly opposite inner end 124IE, 144IE, and 164IE and furthest away from floor lamp 10 (not shown) after the container is fully assembled.

Base panel 124, 144, and 164 further includes a left side end 124LSE, 144LSE, and 164LSE and a right side end 124RSE, 144RSE, and 164RSE. Left side end 124LSE and 144LSE abuts left side end 164LSE of wedge section 160 after the container is fully assembled. Right side end 124RSE and 144RSE abuts right side end 164RSE of wedge section 160 after the container is fully assembled.

FIG. 1f presents a detailed view of circumferentially arrayed stand 180c which is identical in structure to circumferentially arrayed stands 180a, 180b, and 180d. Circumferentially arrayed stands 180a, 180b, 180c, and 180d includes a sidewall 182a, 182b, 182c, and 182d and a base panel 184a, 184b, 184c, and 184d. Sidewall 182a, 182b, 182c, and 182d includes an upper end 182aUE, 182bUE, 182cUE, and 182dUE and a lower end 182aLE, 182bLE, 182cLE, and 182dLE vertically spaced from upper end 182aUE, 182bUE, 182cUE, and 182dUE. Base panel 124 of upper planter section 120 further includes a plurality of longitudinal through-holes or drain ports 124aDP, 124bDP, 124cDP, and 124dDP shaped and positioned to coincide with the shape and position of the upper end 182aUE, 182bUE, 182cUE, and 182dUE. Drain port 124aDP, 124bDP, 124cDP, and 124dDP drain off excess water from upper planter section 120 through circumferentially arrayed stand 180a, 180b, 180c, and 180d, respectively if circumferentially arrayed stand are present, and into lower reservoir section 140.

Referring to FIGS. 1b and 1f and only showing details of circumferentially arrayed stand 180c, base panel 184a, 184b, 184c, and 184d includes an upper surface 184aUS, 184bUS, 184cUS, and 184dUS and a lower surface 184aLS, 184bLS, 184cLS, and 184dLS spaced from upper surface 184aUS, 184bUS, 184cUS, and 184dUS. Lower end 182aLE, 182bLE, 182cLE, and 182dLE of sidewall 182a, 182b, 182c, and 182d integrally attaches to base panel 184a, 184b, 184c, and 184d and upper end 182aUE, 182bUE, 182cUE, and 182dUE of sidewall 182a, 182b, 182c, and 182d integrally attaches to drain port 124aDP, 124bDP, 124cDP, and 124dDP of base panel 124 of upper planter section 120 to form a ballast volume 186a, 186b, 186c, and 186d for holding and containing ballast or soil 18 to wick water 22 into upper planter section 120 and for plants 20 to grow therein.

As shown in FIG. 1b, base panel 184a, 184b, 184c, and 184d of circumferentially arrayed stands 180a, 180b, 180c, and 180d further includes a longitudinal through-holes or weep hole 184aWH, 184bWH, 184cWH, and 184dWH for permitting water 22 to enter ballast volume 186a, 186b, 186c, and 186d of circumferentially arrayed stand 180a, 180b, 180c, and 180d and for letting water 22 drain out of circumferentially arrayed stands 180a, 180b, 180c, and 180d.

As illustrated in FIG. 1a, base panel 124 of upper planter section 120 integrally attaches to lower end 122LE of sidewall 122 of upper planter section 120 to form a ballast volume 126 and a generally longitudinal upper fixture void or pole void 128 extending into ballast volume 126 (not shown). Ballast volume 126 holds and contains ballast or soil 18 (not shown) for plants to grow therein.

Upper fixture void or pole void 128 includes an upper end 128UE and a lower end 128LE vertically spaced from the upper end 128UE. Upper fixture void or pole void 128 further includes a penultimate lower end 128PLE vertically spaced below the upper end 128UE and above the lower end 128LE. The perimeter of upper end 128UE is less than the perimeter of lower end 128LE. Upper fixture void or pole void 128 substantially surrounds a pole 12 and the upper portion of a base stand or pedestal 14 of a generally upright elongated member such as the floor lamp 10 (not shown).

Also shown in FIG. 1a, base panel 144 of lower reservoir section 140 integrally attaches to lower end 142LE of sidewall 142 of lower reservoir section 140 to form a water volume 146, for and a generally latitudinal lower fixture void or base void 148 extending into water volume 146. Water volume 146 holds and contains water 22 (not shown) therein. Lower fixture void or base void 148 includes an upper end 148UE and a lower end 148LE. Lower fixture void or base void 148 substantially surrounds a base stand or pedestal 14 of a freestanding fixture such as the floor lamp 10 (not shown).

Referring to FIGS. 1a and 1e, base panel 164 of wedge section 160 integrally attaches to lower end 162LE of sidewall 162 of wedge section 160 to form a ballast volume 166 and an electric cord tunnel 164T extending into ballast volume 166 (shown in FIG. 1e). Ballast volume 166 holds and contains ballast or soil 18 (not shown) for plants to grow therein.

Operation

Preferred Embodiment—FIGS. 1a-1g

A container of one preferred embodiment, as shown in FIGS. 1a through 1g of the patent drawings, operates in the following manner.

To assemble the container, the user first lifts the empty lower reservoir section 140 and orients lower fixture void or base void 148 to align with pole 12 of freestanding fixture such as floor lamp 10. Then the user moves the empty lower reservoir section 140 toward and around pole 12 and through wedge void 150 so that pole 12 is now in the center of lower fixture void or base void 148 of lower reservoir section 140. Thereafter, the user sets down the empty lower reservoir section 140 such that base void 148 substantially surrounds base stand or pedestal 14 of freestanding fixture such as floor lamp 10, and this again can be accomplished by wedge void 150.

Next the user lifts the empty upper planter section 120 and orients upper fixture void or pole void 128 to align with pole 12 of a freestanding fixture such as floor lamp 10. Then the user moves the empty upper planter section 120 toward and around pole 12 and through lower wedge void 130 so that pole 12 is now in the center of upper fixture void or pole void 128 of the empty upper planter section 120. Thereafter, the user sets down the empty upper planter section 120 on top of the empty lower reservoir section 140 such that upper fixture void or pole void 128 substantially surrounds a portion of the lower end of pole 12 and a fractional portion of the upper end of base stand or pedestal 14 of freestanding fixture such as floor lamp 10. This process may be more easily visualized in reference to FIG. 7, which shows how the steps will work for an alternate container configuration.

Then, the user visually ensures alignment or physically aligns gaps of upper fixture void or pole void 128 with lower fixture void or base void 148.

If the freestanding fixture has an electric cord, then the user aligns an electric cord 16, of a freestanding fixture such as the floor lamp 10, through wedge void (130 and 150) and/or with the tunnel 164T of wedge section 160.

Using grasping notch 162GN and grasping ledge 162GL, the user then lifts the empty wedge section 160 high above upper planter section 120 and lowers it first through wedge void 130 and pole void 128 of upper planter section 120 and then through wedge void 150 and base void 148 of lower reservoir section 140 until connecting groove 122CG of upper planter section 120 detachably mates with connecting tongue 162CT of wedge section 160 such that an electric cord 16 of floor lamp 10 is threaded through tunnel 164T and wedge section 160. Detachably closed off wedge voids 130 and 150 and thus define apertures of the pole void 128 and base void 148.

Next, the user adds ballast 18 into ballast volume 126 of upper planter section 120 and ballast volume 166 of wedge section 160. When potting soil is used as ballast 18 then user may also plant flowers or plants 20 in soil 18.

Afterward the user fills water 22 directly into ballast volume 126 of upper planter section 120 and ballast volume 166 of wedge section 160 by various watering devices.

Alternatively, the user fills sufficient amount of water 22 directly into ballast volume 166 of wedge section 160 and water volume 146 of lower reservoir section 140 through watering port 142WP by various watering devices. Water 22 in water volume 146 will seep upward by wicking through weep holes 184aWH, 184bWH, 184cWH, and 184dWH of circumferentially arrayed stands 180a, 180b, 180c, and 180d into the potting soil 18 to provide water 22 to plants and or flowers 20.

DETAILED DESCRIPTION

Alternate Second Embodiment—FIGS. 2a, 2b

The alternate second embodiment includes an upper planter section 220 with a plurality of tri-sectional circumferentially shaped circumferentially arrayed stands 280a, 280b, and 280c (bottom perspective view and top view) shown in FIGS. 2a and 2b, respectively, a lower reservoir section 140 (top perspective shown in FIG. 1a, and a wedge section 160 (top perspective view) shown in FIG. 1a.

All aspects of the second embodiment are the same as the preferred embodiment except for the shape and configuration and array of a plurality of circumferentially arrayed stands 280a, 280b, and 280c being tri-sectional circumferentially shaped instead of conical shaped. In all other aspects, the second embodiment is similar in structure as the preferred embodiment of the present invention.

Alternate Third Embodiment

Figure 3A:
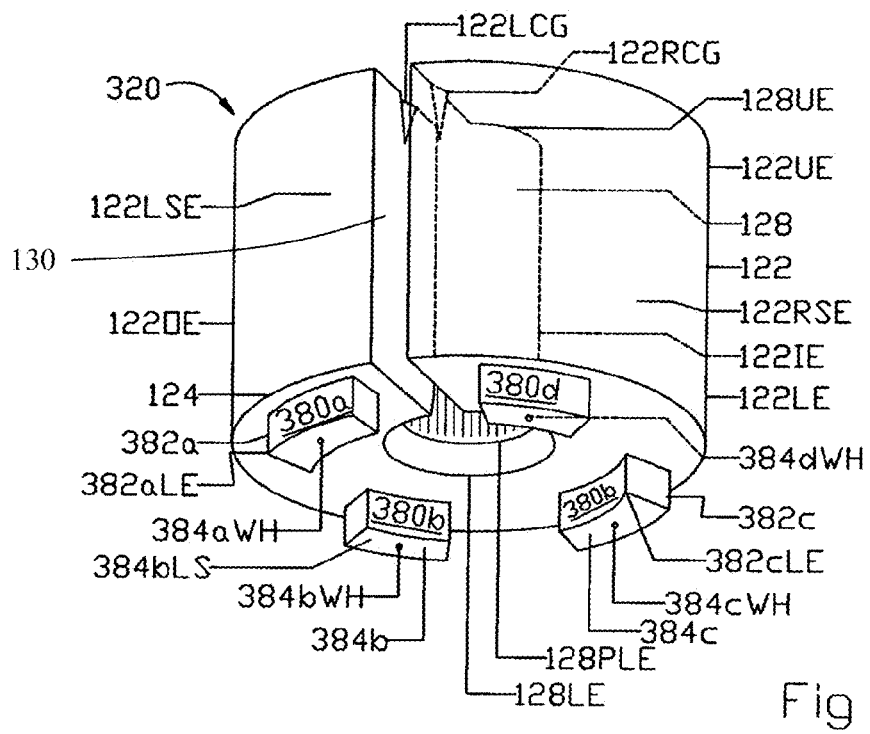
FIG. 3a shows a bottom perspective view of the upper planter section with a plurality of tetra-sectional circumferentially shaped circumferentially arrayed stands.
Figure 3B:
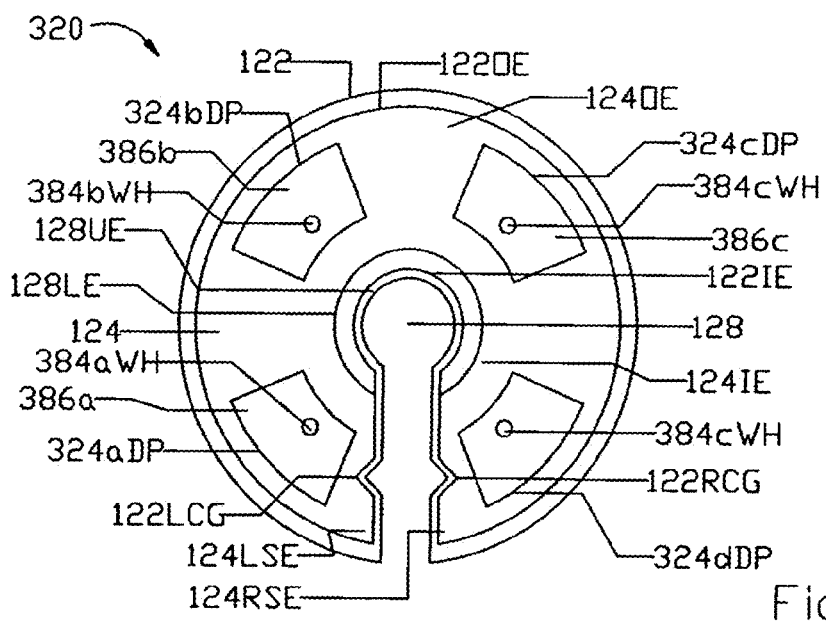
FIG. 3b shows a top view of the upper planter section with a plurality of tri-sectional circumferentially shaped circumferentially arrayed stands.

FIGS. 3a, 3b

The alternate third embodiment includes an upper planter section 320 with a plurality of tetra-sectional circumferentially shaped circumferentially arrayed stands 380a, 380b, 380c, and 380d (bottom perspective view and top view) shown in FIGS. 3a and 3b, respectively, a lower reservoir section 140 (top perspective) shown in FIG. 1a, and a wedge section 160 (top perspective view) shown in FIG. 1a.

All aspects of the third embodiment are the same as the preferred embodiment except for the shape and configuration and array of a plurality of circumferentially arrayed stands 380a, 380b, 380c, and 380d being tetra-sectional circumferentially shaped instead of conical shaped. In all other aspects, the third embodiment is similar in structure as the preferred embodiment of the present invention.

Alternate Fourth Embodiment

FIGS. 4a-4c

The alternate fourth embodiment includes an upper planter section 420 and a lower reservoir section 440, both shown in top perspective view in FIG. 4a. FIGS. 4b and 4c show the alternate fourth embodiment in top view.

All aspects of the fourth embodiment are the same as the preferred embodiment except circumferentially arrayed stands 180a, 180b, 180c, and 180d of container 100 are excluded. Base panel 124 of upper planter section 420 is now a continuous surface with a plurality of longitudinal throughholes or drain ports 124aDP, 124bDP, 124cDP, and 124dDP.

In all other aspects, the fourth embodiment is similar in structure to the preferred embodiment of the present invention.

Alternate Fifth Embodiment

FIGS. 5a-5d

Figure 5A:
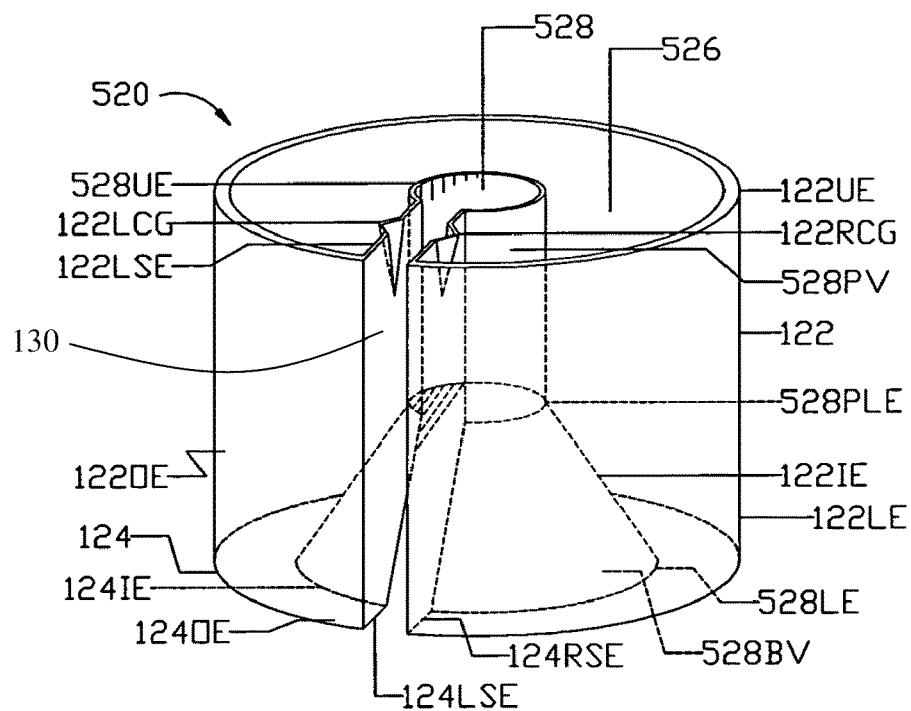
FIG. 5a shows a top perspective view of the planter section resulting from combining the upper planter section and the lower reservoir section.
Figure 5B:
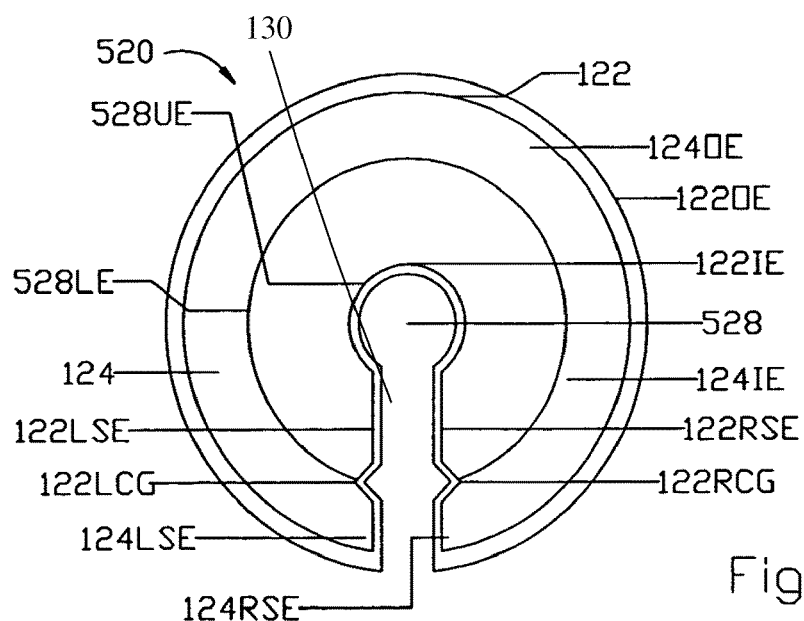
FIG. 5b shows a top view of the planter section.

The alternate fifth embodiment includes a planter section 520 (top perspective view and top view) shown in FIGS. 5a and 5b, respectively, and a wedge section 160 (top perspective view) shown in FIG. 1a.

FIGS. 5a and 5b show an alternative design that combines upper planter section 120 and lower reservoir section 140 of the preferred embodiment to form a single planter section 520 of the alternate fifth embodiment.

FIG. 5a gives a good view of the fixture void 528 comprising of a pole void 528PV in the upper portion and a base void 528BV in the lower portion, as well as wedge void 130. As can be seen, said fixture void 528 connects to wedge void 130 that comprises an empty space in said container or said upper planter section capable of admitting the pole in said pole void (528PV), and capable of admitting the pedestal or base stand in said base void (528BV).

As further can be seen in FIG. 5a, the container wedge void 130 is formed by the boundaries of 124LSE, 124RSE, and is capable of admitting at least the lower end of said pole of the floor lamp type fixture, thereby allowing the lower portion of the pole and the base stand to reach the fixture void of the container, from a position outside of the container, without disassembling either the floor lamp type fixture or at the lower portion of the container or upper planter section.

All aspects of the fifth embodiment are generally the same as the preferred embodiment of except the base panel 124 and attached circumferentially arrayed stands 180a, 180b, 180c, and 180d, both of the upper planter section 120, are eliminated. Another exception is the further exclusion of the watering port 142WP of the lower reservoir section 140. Additional exception is the seamless and integral attaching of lower end 122LE of sidewall 122 of upper planter section 120 to upper end 142UE of sidewall 142 of lower reservoir section 140 to form a ballast volume 526 and a fixture void 528 both of planter section 520. Fixture void 528 includes an upper end 528UE, a penultimate lower end 528PLE and a lower end 528LE. Upper end 528UE and penultimate lower end 528PLE combine to form an upper fixture void or pole void 528PV. Penultimate lower end 528PLE and lower end 528LE combine to form a lower fixture void or base void 528BV. Another exception is in the use of water volume 146 of lower reservoir section 140 in preferred embodiment as ballast volume 526 of planter section 520.

All other aspects of ballast volume 526 are the same as ballast volume 126 of the preferred embodiment. All other aspects of fixture void 528 are the same as a combination of the upper fixture void or pole void 128 and the lower fixture void or base void 148 of upper planter section 120 and lower reservoir section 140, respectively, of the preferred embodiment. All other aspects of planter section 520 are the same as a combination of upper planter section 120 and lower reservoir section 140, of the preferred embodiment.

Figure 5C:
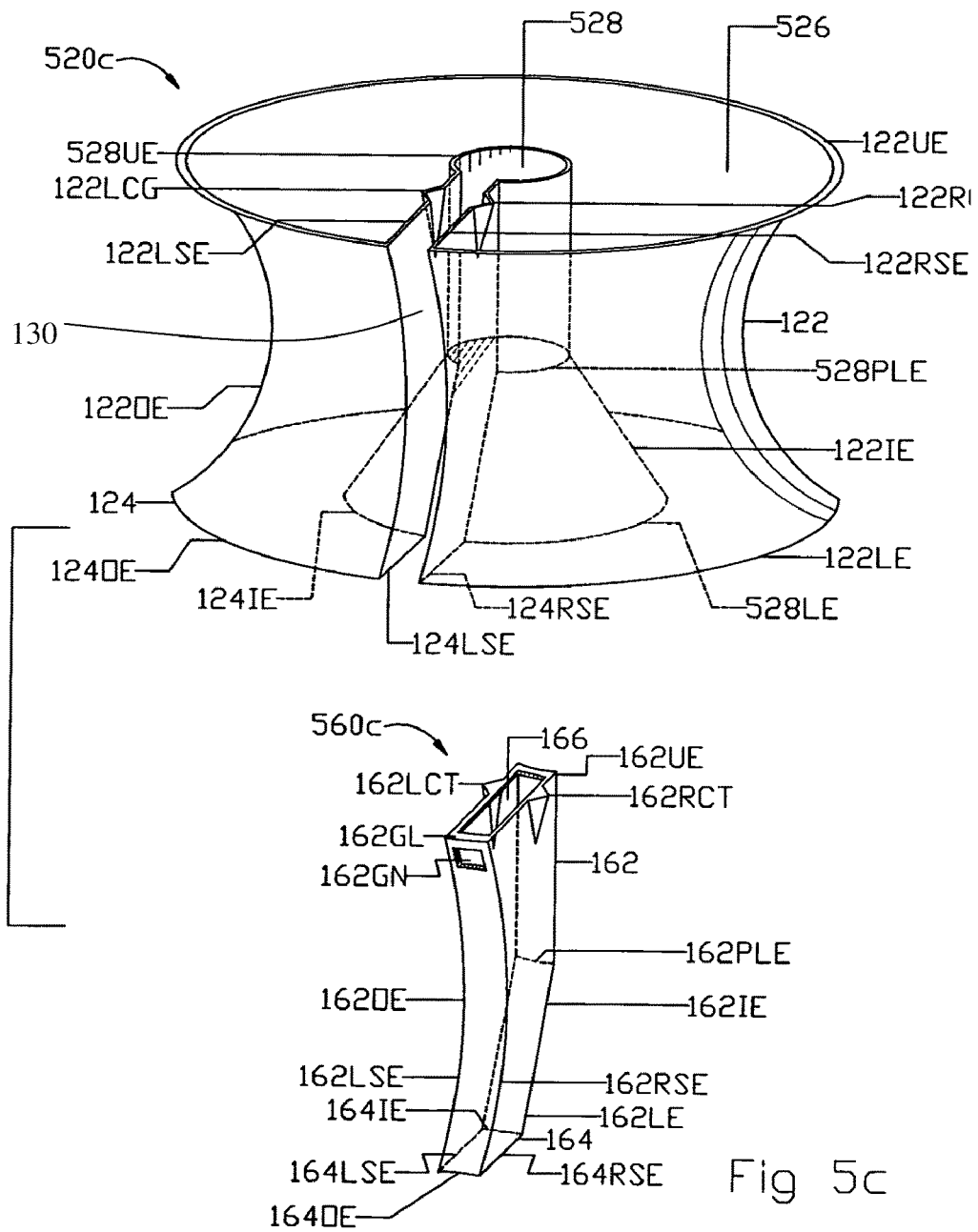
FIG. 5c shows a top perspective view of the planter section shaped as a concave cylinder and also shows a top perspective view of the corresponding wedge section shaped such that it conforms to the concave cylinder shaped planter section. For simplicity, the wedge section is shown without the electric cord tunnel.

There are various possibilities with regard to the shape of the fifth embodiment. For example FIG. 5c shows a top perspective view of planter section 520c shaped as a concave cylinder. FIG. 5c also shows a top perspective view of a corresponding wedge section 560c shaped such that it conforms to planter section 520c. For simplicity, FIG. 5c shows wedge section 560c without the electric cord tunnel 164T.

Figure 5D:
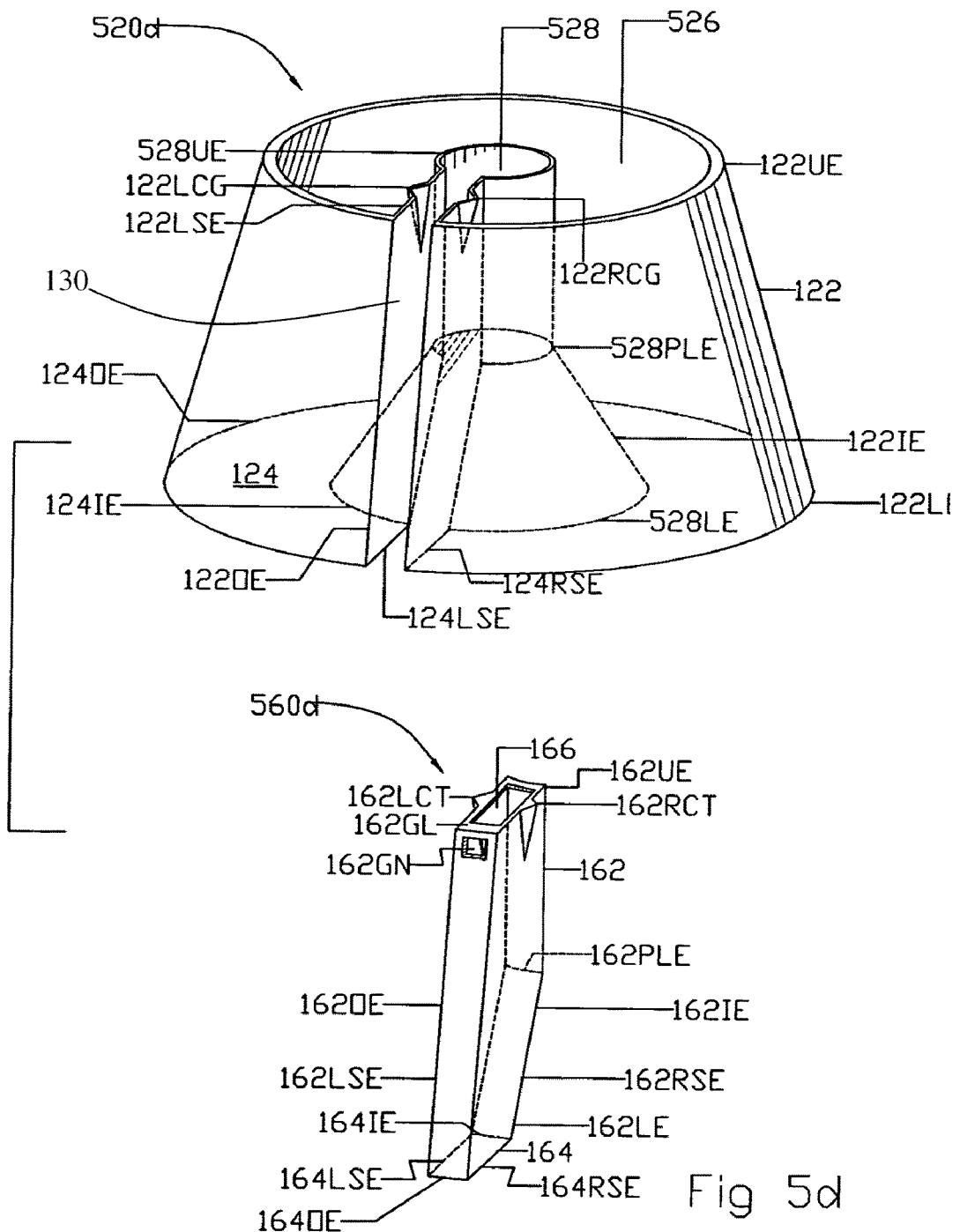
FIG. 5d shows a top perspective view of the planter section shaped as a truncated upright cone and also shows a top perspective view of the corresponding wedge section shaped such that it conforms to the truncated upright cone shaped planter section. For simplicity, the wedge section is shown without the electric cord tunnel.

Another example, FIG. 5d shows a top perspective view of planter section 520d shaped as a truncated upright cone. FIG. 5d also shows a top perspective view of a corresponding wedge section 560d shaped such that it conforms to planter section 520d. For simplicity, FIG. 5d shows wedge section 560d without the electric cord tunnel 164T.

In all other aspects, the fifth embodiment is similar in structure as the preferred embodiment of the present invention.

Alternate Sixth Embodiment

FIGS. 6a-6l

Figure 6A:
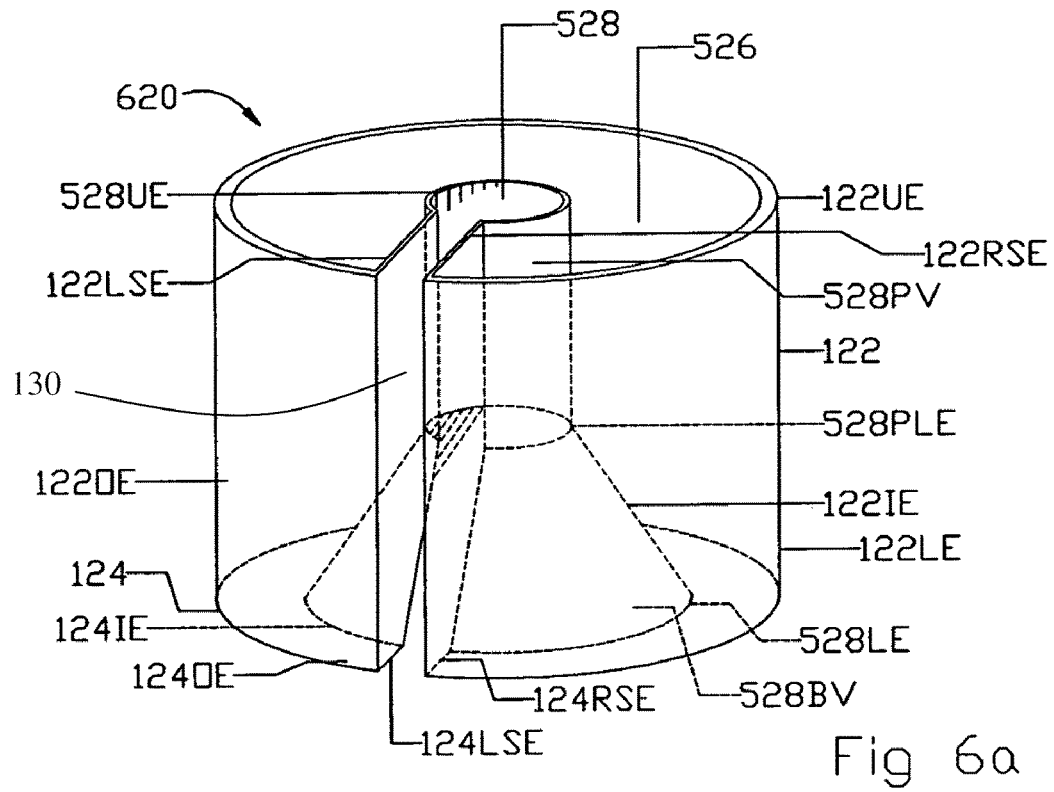
FIG. 6a shows a top perspective view of the planter section without the left and right connecting grooves.
Figure 6B:
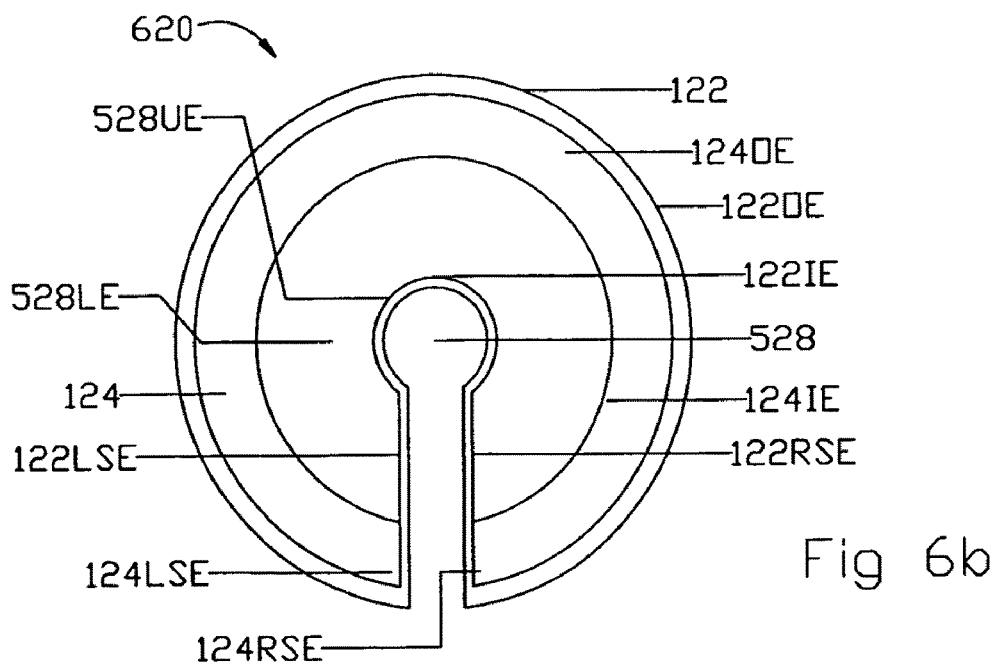
FIG. 6b shows a top view of the planter section without the left and right connecting grooves.

The alternate sixth embodiment includes a planter section 620 (top perspective view and top view) shown in FIGS. 6a and 6b, respectively.

FIGS. 6a and 6b show an alternative design that combines upper planter section 120 and lower reservoir section 140 of the preferred embodiment to form a planter section 620 without the left and right connecting grooves 122LCG and 122RCG, respectively.

All aspects of the sixth embodiment are the same as the preferred embodiment except wedge section 160, the left and right connecting grooves 122LCG and 122RCG, respectively, of upper planter section 120 are eliminated. Another exception is that the base panel 124 and attached circumferentially arrayed stands 180a, 180b, 180c, and 180d are also eliminated. Another exception is further exclusion of the watering port 142WP of the lower reservoir section 140. Another exception is the seamless and integral attaching of lower end 122LE of sidewall 122 of upper planter section 120 to upper end 142UE of sidewall 142 of lower reservoir section 140 to form a ballast volume 526 and a fixture void 528 both of a planter section 520. Fixture void 528 includes an upper end 528UE, a penultimate lower end 528PLE and a lower end 528LE. Upper end 528UE and penultimate lower end 528PLE combine to form an upper fixture void or pole void 528PV. Penultimate lower end 528PLE and lower end 528LE combine to form a lower fixture void or base void 528BV. Another exception is in the use of water volume 146 as ballast volume 526 of planter section 620.

All other aspects of ballast volume 526 are the same as ballast volume 126 of the preferred embodiment. All other aspects of fixture void 528 are the same as a combination of the upper fixture void or pole void 128 and the lower fixture void or base void 148 of upper planter section 120 and lower reservoir section 140, respectively, of the preferred embodiment. All other aspects of planter section 520 are the same as a combination of upper planter section 120 and lower reservoir section 140, of the preferred embodiment.

Figure 6C:
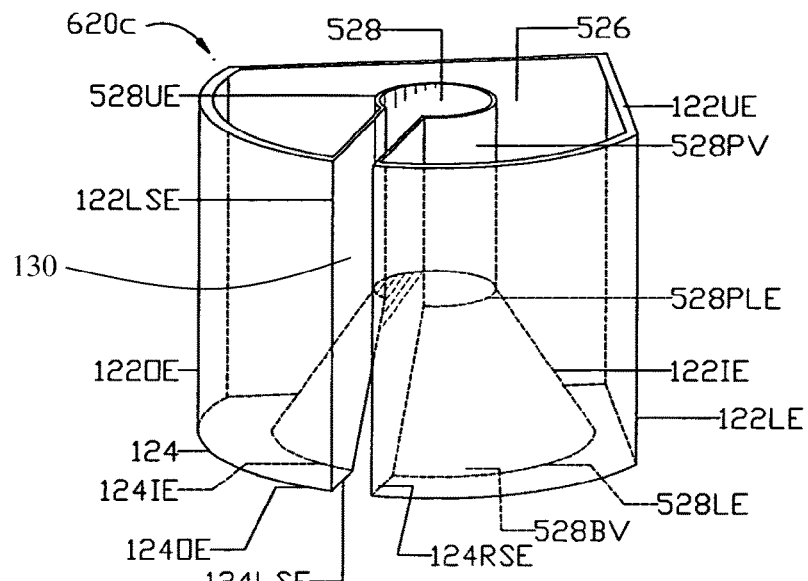
FIG. 6c shows a top perspective view of the planter section without the left and right connecting grooves and shaped as a quarter cylinder.
Figure 6D:
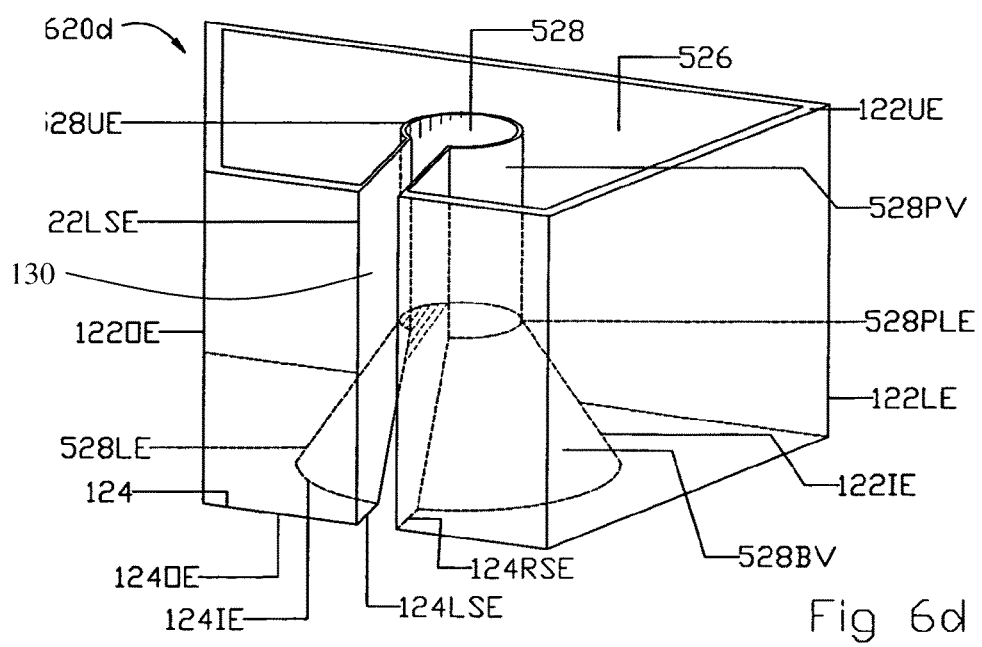
FIG. 6d shows a top perspective view of the planter section without the left and right connecting grooves and shaped as a trapezoid.

There are various possibilities with regard to the shape of the sixth embodiment. For example FIG. 6c shows a top perspective view of planter section 620c shaped as a quarter cylinder. Another example, FIG. 6d shows a top perspective view of planter section 620d shaped as a trapezoid.

Figure 6E:
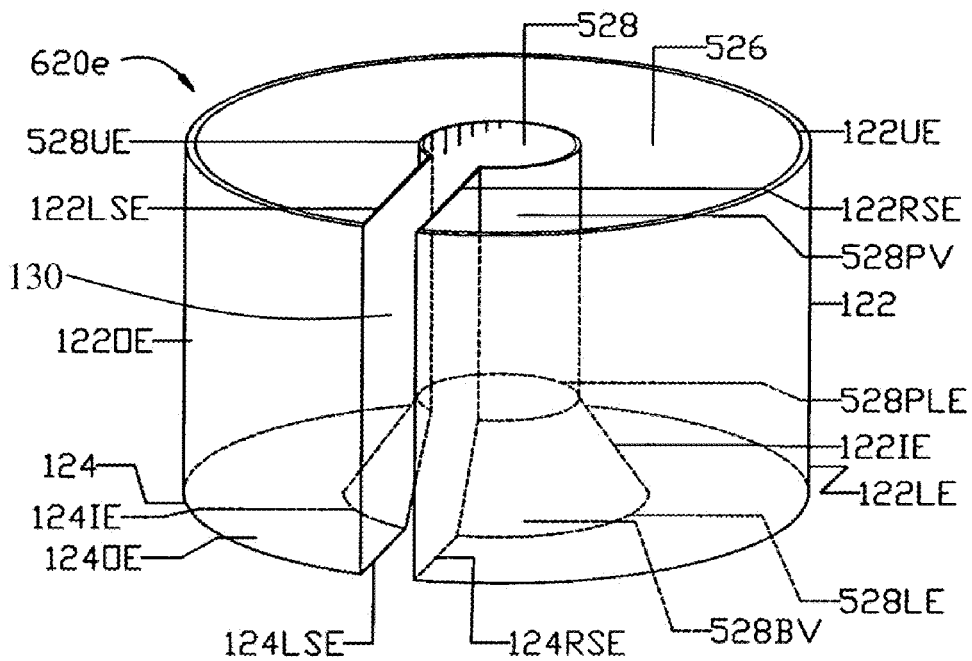
FIG. 6e shows a top perspective view of the planter section without the left and right connecting grooves and having a fixture void with a truncated upright cone shaped lower fixture void or base void.
Figure 6F:
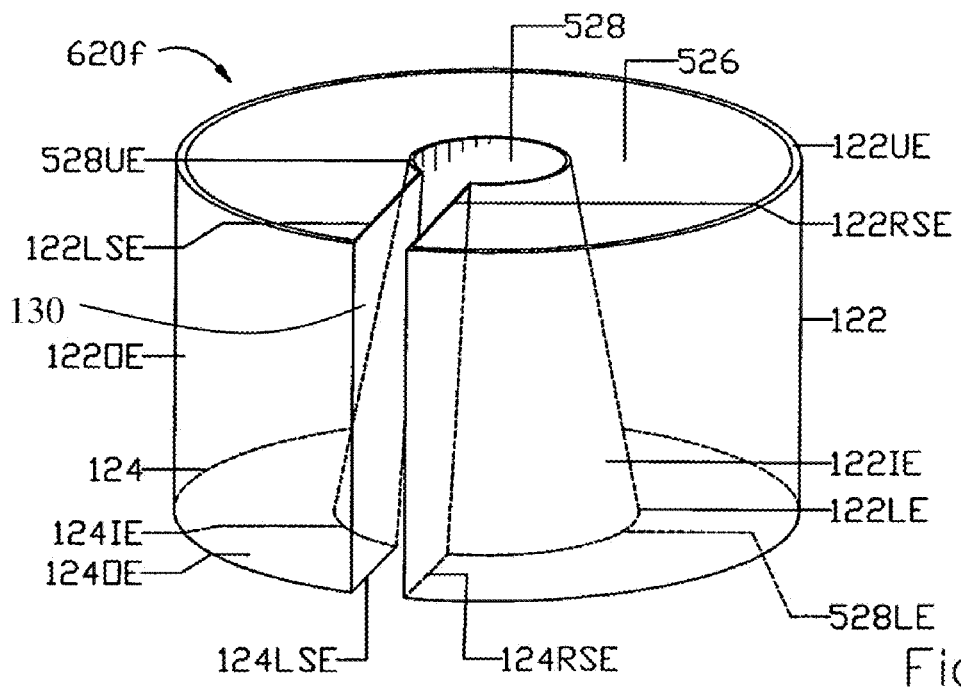
FIG. 6f shows a top perspective view of the planter section without the left and right connecting grooves and having a truncated upright cone shaped fixture void.
Figure 6G:
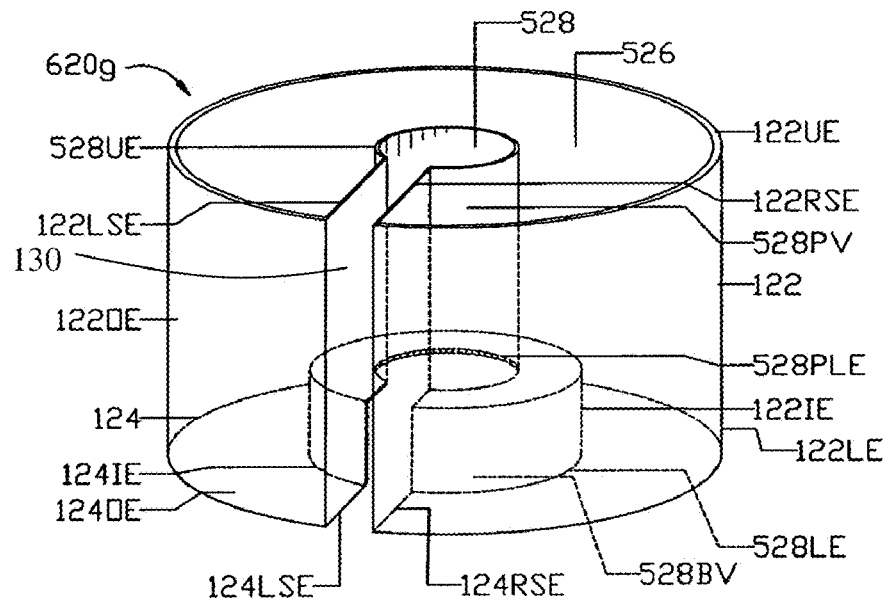
FIG. 6g shows a top perspective view of the planter section without the left and right connecting grooves and having a thick cylinder shaped lower fixture void or base void.
Figure 6H:
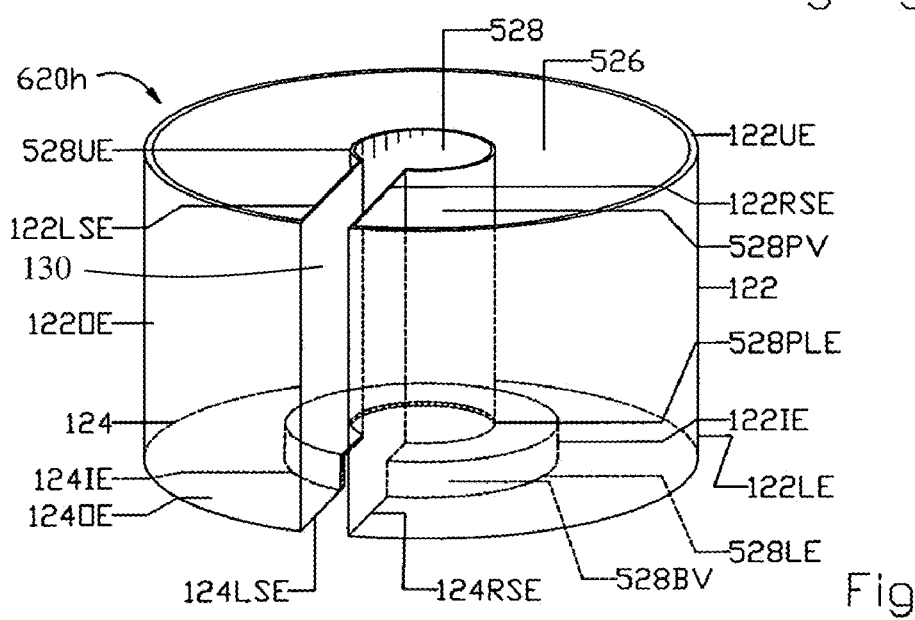
FIG. 6h shows a top perspective view of the planter section without the left and right connecting grooves and having a thin cylinder shaped lower fixture void or base void.
Figure 6I:
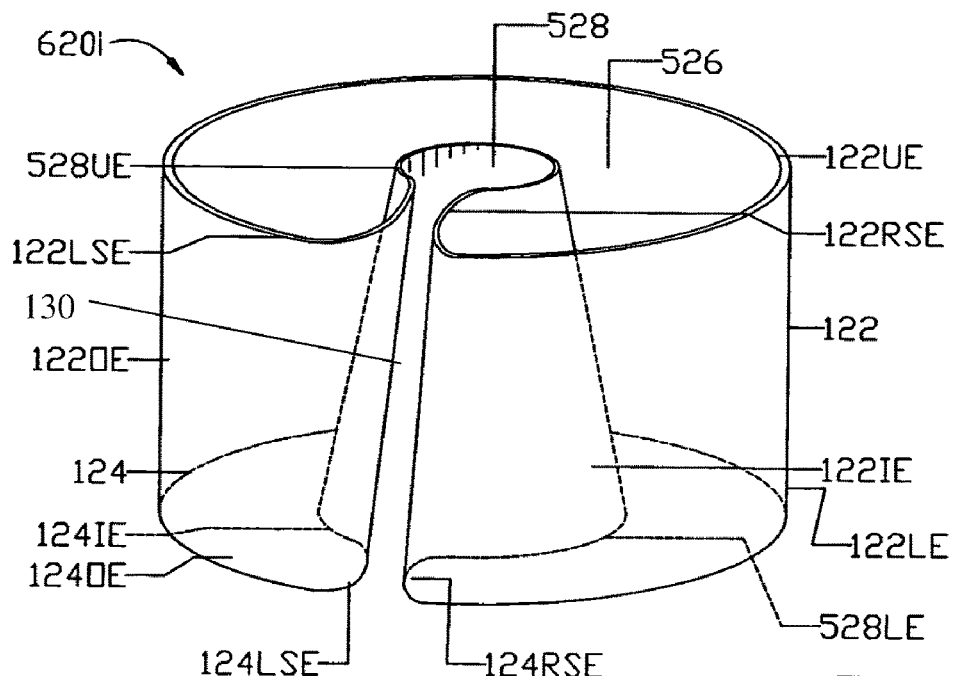
FIG. 6i shows a top perspective view of the planter section without the left and right connecting grooves and having a curvilinear truncated upright cone shaped fixture void.
Figure 6J:
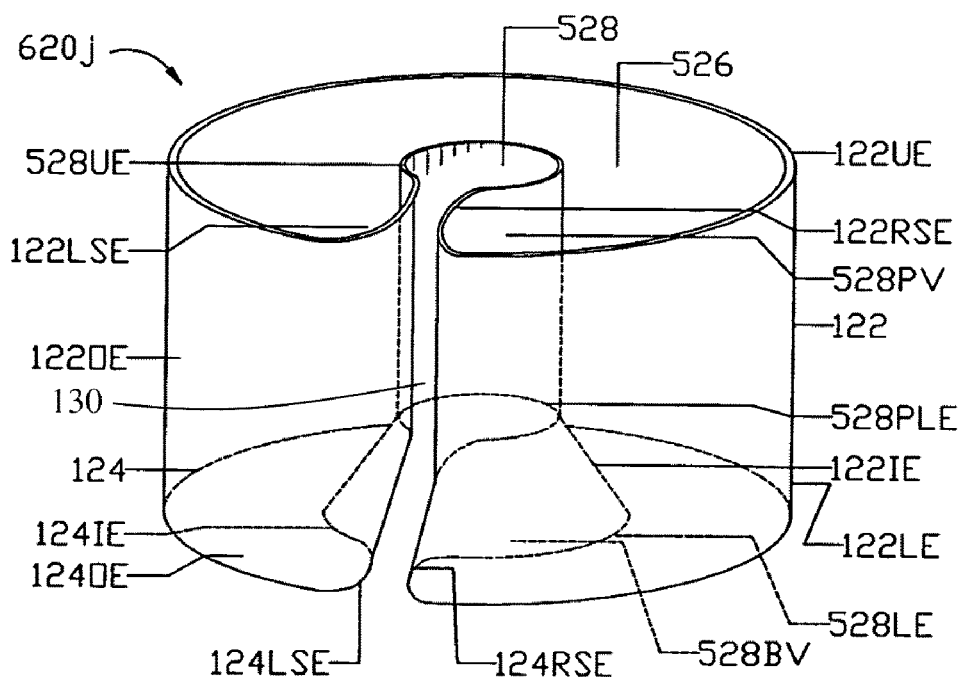
FIG. 6j shows a top perspective view of the planter section without the left and right connecting grooves and having a curvilinear truncated upright cone shaped lower fixture void or base void.
Figure 6K:
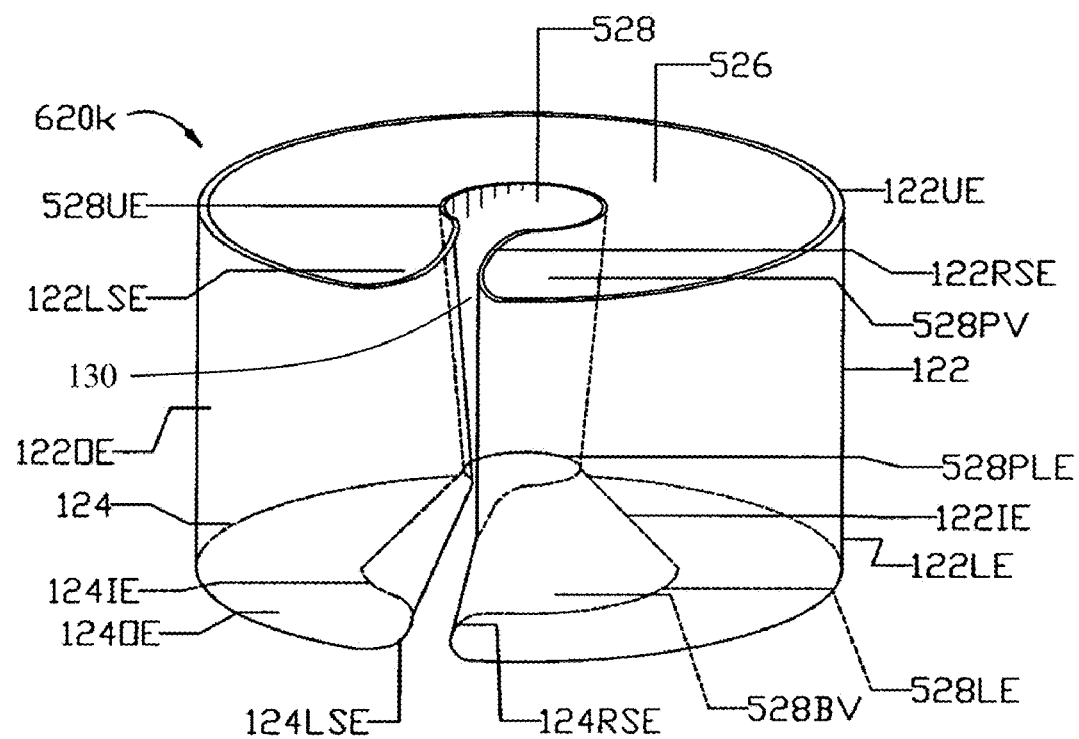
FIG. 6k shows a top perspective view of the planter section without the left and right connecting grooves and having a truncated inverted cone shaped upper fixture void or pole void.
Figure 6L:
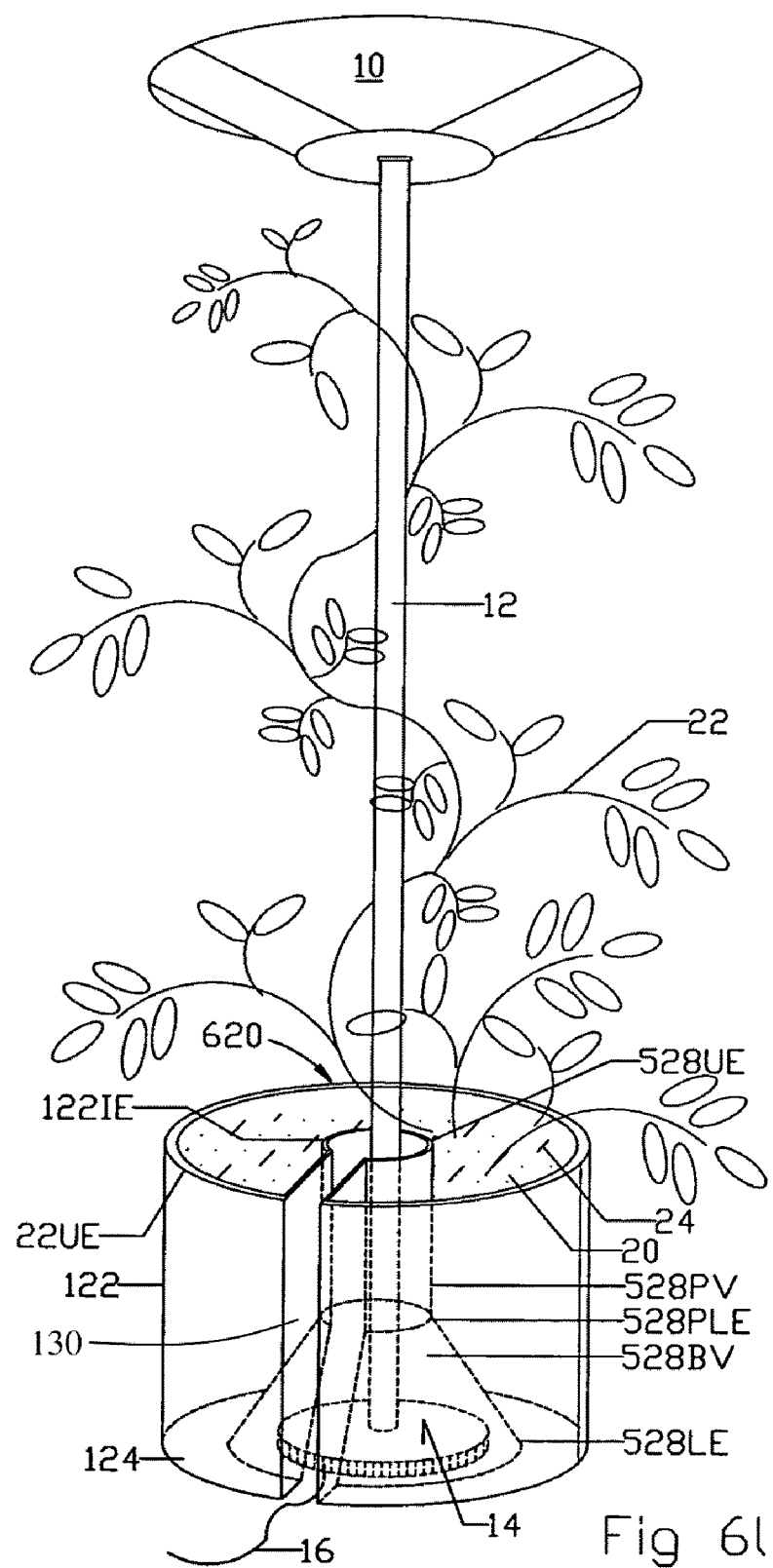
FIG. 6l shows a top perspective view of a fully assembled planter section without the left and right connecting grooves and having a fixture void with a truncated upright cone shaped lower fixture void or base void.

Furthermore, there are various possibilities with regard to the shape of fixture void 528 of the sixth embodiment as illustrated in FIGS. 6e through 6h, which present top perspective view. FIG. 6e shows a planter section 620e having a truncated upright cone shaped lower fixture void or base void 528BV; FIG. 6f shows a planter section 620f having a truncated upright cone shaped fixture void 528 without the penultimate lower end 528PLE; FIG. 6g shows a planter section 620g having a thick cylindrical shaped base void 528BV; FIG. 6h shows a planter section 620h having a thin cylindrical shaped lower fixture void or base void 528BV; FIG. 6i shows a planter section 620i having a curvilinear truncated upright cone shaped fixture void 528; FIG. 6j shows a planter section 620j having a curvilinear truncated upright cone shaped lower fixture void or base void 528BV; FIG. 6k shows a planter section 620k having a truncated inverted cone shaped upper fixture void or pole void 528PV; and FIG. 6l show a fully assemble planter section 620.

In all other aspects, the sixth embodiment is similar in structure to the preferred embodiment of the present invention.

Seventh Embodiment

FIG. 7

Figure 7:
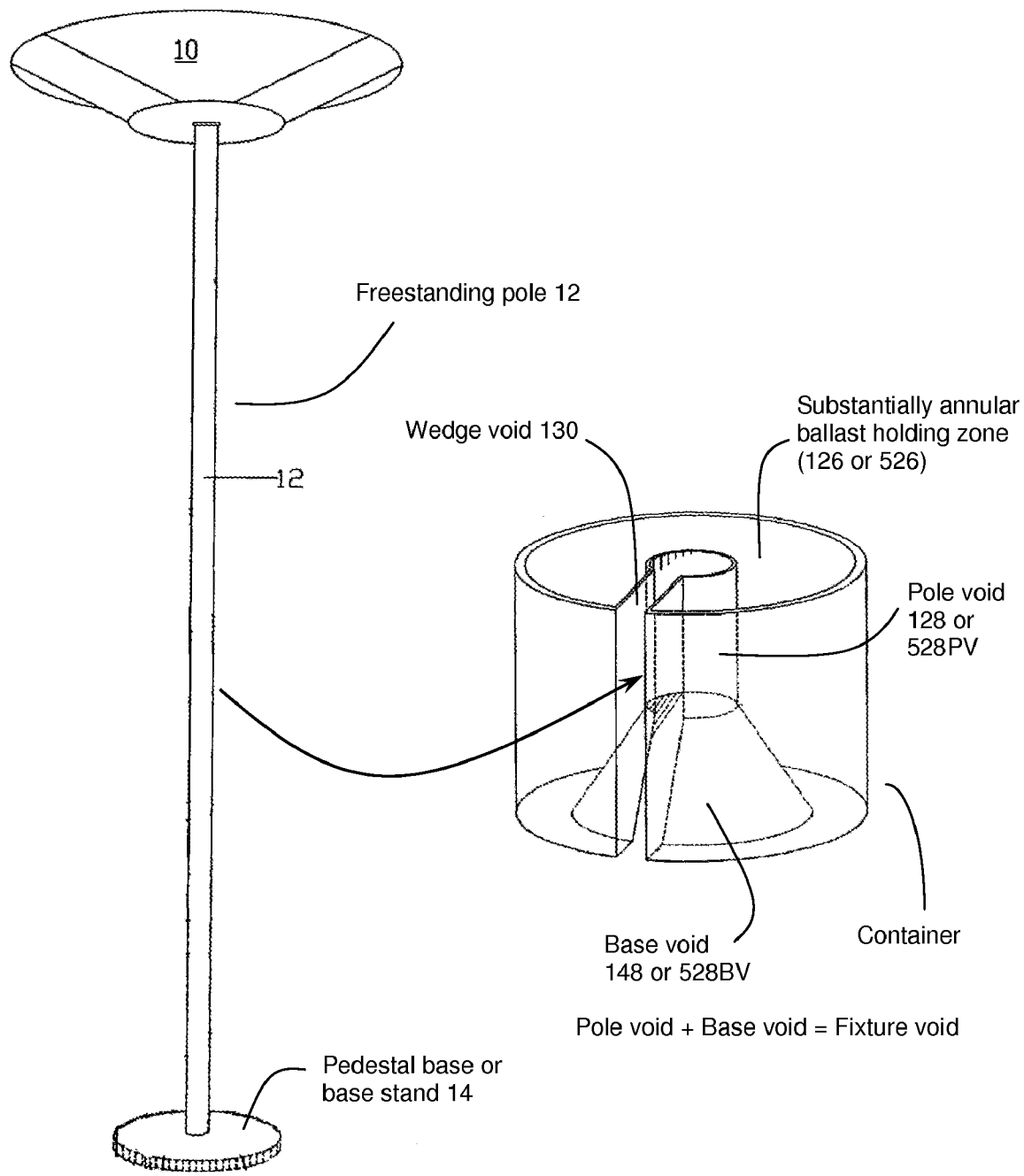
FIG. 7 shows a view of the fully assembled planter section showing the fixture void and wedge void.

FIG. 7 shows additional details and nomenclature for the pole-planter configuration previously shown in FIG. 6l. As can be seen, the pole portion of the freestanding pole (12) can fit into the wedge void 130 of the container. If the container is held above the pedestal base or base stand (14), the pole can completely enter into the container. The container can then be lowered on top of the pedestal base or base stand (14), thus enclosing the pedestal base or base stand (14) inside of the base void 148.

ADVANTAGES OF THE PRESENT INVENTION

Thus, the reader will see that the invention resourcefully stabilizes and decorates freestanding fixtures such as floor lamps without crowding and cluttering adjoining floor space with multiple units.

The invention provides stability by minimizing wobbling of the freestanding fixture if it is bumped and by creating a contact barrier.

The invention decorates the freestanding fixture by surrounding the fixture with an attractive planter that can be filled with pretty ballast or plant life.

Also, the invention unifies a decorating theme by adapting a similar container motif to a broad range of freestanding fixtures in a room or an outdoor setting.

Furthermore, the invention easily assembles and disassembles without requiring tools, or tampering with the freestanding fixture, or mounting hardware such as screws, nails, or brackets.

In addition, the invention economizes floor space by surrounding and sharing the same general location with, not adjacent to, the freestanding fixture.

The invention further conserves floor space by obviating the need to surround a freestanding fixture with multiple container units.

CONCLUSION, RAMIFICATION, AND SCOPE OF INVENTION

While the above description contains much specificity, these should not be construed as limiting the scope of the invention but as merely providing illustrations of some of the presently preferred embodiments of this invention.

For example, the electric cord tunnel can have other locations instead of the base panel, such as the side of the wedge section, or on the lower side of the upper planter section that abuts the wedge section, or on the lower side of the lower reservoir section that abuts the wedge section, etc.; the wedge section can be horizontally separated into two sections, one for the upper planter section and the other for the lower reservoir section, and the lower reservoir section and its wedge section can have connecting groove and connecting tongue respectively etc.; the grasping ledge can be eliminated or replaced by other types of handles for inserting and removing wedge section into and from planter section etc.; the electric cord tunnel can have other shapes, such as truncated circle, rectangle, truncated oval, etc.; the invention can have various shapes such as a concave cylinder shape, a convex cylinder shape, a half cylinder shape, a truncated cylinder shape, a quarter cylinder shape, a right triangle shape, an equilateral triangle shape, a square shape, a rectangle shape, a truncated inverted cone shape, a truncated upright cone shape, a trapezoid shape, etc.; the connecting groove and connecting tongue can be eliminated or replaced by hinges or other connecting means which connects two otherwise unconnected sections etc.; the watering port can be eliminated or can have other shapes, such as an oval latitudinal through-hole without the protruding lip, a triangle lip, a square lip etc.; the grasping notch can be eliminated or can have a different shape, such as oval, rectangle, etc.; the invention can be made of different material, such as durable or semi-durable plastic, ceramic, wire, wicker etc.; the lower end of the upper planter section can have a diameter that is smaller than that of the lower reservoir section such that the upper planter section rests on the upper surface of the base panel of the lower reservoir section instead of resting on the upper end of the sidewall of the lower reservoir. Similarly, in some embodiments, the upper fixture void or pole void can have a diameter greater than that of lower fixture void or base void such that the lower end of upper fixture void or_pole void outwardly stacks or nests with the upper end of the lower fixture void or_base void.

The location of the fixture void or pole void and base void together, can vary. For instance, they can be on any one of the five sides of a trapezoidal embodiment, or they can be on any one of the four sides of a rectangular embodiment, or they can be on any one of the three sides of an equilateral triangle embodiment, or it can be on anyone of the three sides on the quarter cylinder embodiment. Some embodiments can also have multiple fixture voids with associated wedge voids to support multiple freestanding fixtures.

As an example, for embodiments with two sections, a single upper planter section can have multiple upper fixture voids or pole voids with associated wedge voids with corresponding lower fixture voids or base voids in a single lower reservoir section to support multiple freestanding fixtures.

The fixture void can have various shapes such as a truncated pyramid, a truncated upright cone shaped lower fixture void or base void, a truncated upright cone shaped fixture void, a thick cylindrical shaped lower fixture void or base void, a thin cylindrical shaped lower fixture void or_base void, a curvilinear truncated upright cone shaped fixture void, a curvilinear truncated upright cone shaped lower fixture void or base void, a truncated inverted cone shaped upper fixture void or pole void.

In some embodiments, the penultimate lower end of planter section can be eliminated resulting in a fixture void such as the curvilinear truncated upright cone shaped fixture void, or a truncated upright cone shaped fixture void. The height or depth of the lower reservoir section and specifically the lower fixture void or base void can also be adjusted to accommodate base stands or pedestals of freestanding fixtures.

Some embodiments may lack circumferentially arrayed stands. If the pedestal of the freestanding fixture is thin, the height of the circumferentially arrayed stands, and the lower reservoir section can alternatively be shortened to the point where the lower reservoir section may serve only as a drainage plate or tray. Here the functionality of surrounding a base stand or a pedestal is provided by the lower portion of the upper planter section.

In other embodiments, the invention may or may not have right and left connecting grooves and may or may not have connecting tongues. In some embodiments, the invention may only have right or left connecting groove and connecting tongues.

The invention can also be used with other freestanding fixtures such as floor fans, coat stands, umbrella stands, patio sun umbrellas, hat stands, etc. The invention can be used as a display container with a bottle of wine placed in the fixture void and or in the wedge void and cheeses and fruits or other material may placed in the ballast volume.

The ballast volume of the invention can include a cover panel detachably mated on the upper end of the sidewall which can serve as a table surface, while the wedge void and fixture void remain available to admit and house the freestanding fixture.

In some embodiments, the wedge section can serve both as a water storage and as an irrigation means for plants. In other embodiments, the fixture void and the wedge void of the invention can include a cover panel detachably mated on the upper end of their sidewall, and serve as pet house or shelter for a small pet such as a cat or kitten, while the ballast volume remains available for ballast and or plants to grow therein.

Alternatively, the invention can house a regular planter with plants in the base void, and allow these plants to protrude both through and out of the pole void. Here the ballast volume would also remain available for ballast, plant growth, and water storage with irrigation means.

The invention claimed is:

1. A container for a freestanding fixture comprising a pole with a pedestal, weighted foot, or base stand attached to the lower portion of said pole, said container comprising;
   (a) a solid sidewall and a solid base panel;
   (b) said solid sidewall integrally attached to said solid base panel;
   (c) said container further comprising a ballast volume and a fixture void extending into said ballast volume said fixture void comprising a smaller diameter substantially cylindrical pole void opening with solid walls capable of holding only the pole portion of said pole, extending into a larger diameter base void with solid walls comprising a substantially cylindrical, conical, or other axis of rotation shape that is capable of encompassing or covering said pedestal, weighted foot or base stand, said larger diameter base void having a diameter that is greater than three times the diameter of said pole void;

(d) said ballast volume capable of holding ballast or soil content without the need of a liner;

(e) said fixture void capable of receiving and holding at least portions of said freestanding fixture, said fixture void comprising a pole void and a base void;

whereby said fixture void of said container admits and substantially surrounds said pedestal, weighted foot or base stand and at least the lower portion of said pole of said freestanding fixture creating a contact barrier such that said freestanding fixture is constrained from tipping over if accidentally bumped;

wherein said container additionally comprises a wedge void capable of admitting at least said pole, thereby allowing said pole and said pedestal, weighted foot or said base stand to reach said fixture void of said container from a position outside of said container, without disassembling said freestanding fixture or said container.

2. The container of claim 1, wherein said container further comprises at least 75% of the perimeter of a structural configuration or shape selected from the group consisting of a straight sided cylinder, a concave cylinder, a truncated upright cone or any polygonal shape; and said wedge void comprises a structural configuration or shape that complements the perimeter of said selected shape of said container, so that said container plus the space occupied by said wedge void, if said wedge void was solid, would comprise a complete straight sided cylinder, a concave cylinder, a truncated upright cone or any polygonal shape.

3. The container of claim 1, wherein said container separates into an upper planter section capable of containing ballast or soil, and a lower reservoir section capable of containing water.

4. The container of claim 3, wherein said base panel of said upper planter section includes a plurality of circumferentially arrayed stands on the perimeter of said base panel that comprise a means for wicking water upward and through soil, from said lower reservoir section into said upper planter section.

5. The container of claim 4, wherein each of said circumferentially arrayed stands includes a structural configuration or shape selected from the group consisting of conical shape, tri-sectional circumferential shape, tetra-sectional circumferential shape, or any polygonal shape.

6. The container of claim 3, wherein said lower reservoir section includes a device for adding water into said lower reservoir section; said device comprising a watering port or opening for irrigating plants.

7. The container of claim 1, wherein the diameter of said base void is at least twice the diameter of said pole void.

8. The container of claim 1, wherein the height of said pole void, absent any height due to the base void, is between 15% and 90% of the height of said container minus the height of any container support legs.

9. A container with solid side walls intended to fit around a freestanding pole with a pedestal base, said pole having a diameter substantially smaller than the diameter of said container, said pedestal base having a diameter larger than said diameter of said pole, but smaller than the diameter of said container, said container comprising:

a top with a substantially annular ballast holding zone;
a bottom comprising a solid base panel;
a fixture void extending from said top to said bottom;
said substantially annular ballast holding zone having a first perimeter comprising the substantial majority of the perimeter of an annular ring-like structure;
said container having a wedge void extending from the outer edge of the substantially annular ballast holding zone to said fixture void of said annular ring-like structure;
said wedge void having a second perimeter so that the space occupied by the wedge void, if said wedge void was solid, in combination with said first perimeter, would comprise a full perimeter of an annular ring-like structure;
said fixture void having, at the top of said container, a pole void with dimensions capable of admitting said pole, and at the bottom of said container, a base void with dimensions capable of admitting said pedestal base;
said fixture void comprising a smaller diameter substantially cylindrical pole void opening with solid walls capable of holding only the pole portion of said pole, extending into a larger diameter base void with solid walls comprising a substantially cylindrical, conical, or other axis of rotation shape that is capable of encompassing or covering said pedestal base, said larger diameter base void having a diameter that is greater than three times the diameter of said pole void
wherein said container, when exterior to said pole with a pedestal base, may be slid around said pole with a pedestal base without having to disassemble either said pole with a pedestal base, or said container;
and wherein the side walls of said container beyond said fixture void provide freestanding pole stability by minimizing wobbling of the freestanding pole if said pole is bumped by creating a contact barrier with said pole.

10. The container of claim 9, further comprising a detachable wedge section with solid walls, said wedge section capable of being inserted into and/or being removed from said wedge void from above without tools and without disassembling either said container or said pole with a spread base;
in which said wedge section is capable of holding ballast.

11. The container of claim 9, in which said container further comprises a substantially annular upper ballast holding section detachable from a substantially annular lower section.

12. The container of claim 9, in which said ballast is selected from the group consisting of soil, planting soil, glass marbles, or other aesthetically pleasing material.

13. The container of claim 9, in which said substantially annular ballast holding zone is substantially circular, and said annular ring-like structure comprises a ring with an interior fixture void.

14. The container of claim 9, in which said substantially annular ballast holding zone comprises a polygon, and said annular ring-like structure comprises a polygon with an interior fixture void.

15. The container of claim 9, wherein said second perimeter of said wedge void is selected to be wide enough to admit at least said pole.

16. The container of claim 9, wherein the diameter of said base void is at least four times the diameter of said pole void.

17. The container of claim 9, wherein the height of said pole void, absent any height due to the base void, is between 15% and 90% of the height of said container minus the height of any container support legs.

18. A method for augmenting the stability of a freestanding fixture having a pole with a pedestal, weighted foot, or base stand attached to the lower portion of said pole, comprising;

(a) providing a container comprising a sidewall with solid walls and a solid base panel;
(b) integrally attaching said sidewall to said base panel;
(c) forming a ballast volume, a fixture void and a wedge void; said fixture void and said wedge void extending into said ballast volume; said fixture void comprising a pole void and a base void; said wedge void extending from the outer perimeter of said container to said fixture void;
(d) inserting ballast or soil or content into said ballast volume;
(e) inserting said freestanding fixture into said fixture void by way of said wedge void;
  whereby said fixture void of said container admits and substantially surrounds said pedestal, weighted foot, or base stand and at least the lower portion of said pole of said freestanding fixture creating a contact barrier such that said freestanding fixture is constrained from tipping over if accidentally bumped; and
  wherein said fixture void comprises a smaller diameter substantially cylindrical pole void opening with solid walls capable of holding only the pole portion of the pole, extending into a larger diameter base void with solid walls comprising a substantially cylindrical, conical, or other axis of rotation shape that is capable of encompassing or covering said pedestal, weighted foot or base stand, said larger diameter base void having a diameter that is greater than three times the diameter of said pole void.

19. The method of claim 18, wherein the diameter of said base void is at least four times the diameter of said pole void.

20. The method of claim 18, wherein said container separates into an upper planter section capable of containing ballast or soil, and a lower reservoir section capable of containing water.

* * * * *